(12) United States Patent
Maruyama et al.

(10) Patent No.: US 12,042,965 B2
(45) Date of Patent: Jul. 23, 2024

(54) INJECTION MOLDING SYSTEM

(71) Applicant: SEIKO EPSON CORPORATION, Tokyo (JP)

(72) Inventors: Hidenobu Maruyama, Azumino (JP); Kenta Anegawa, Matsumoto (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 17/953,933

(22) Filed: Sep. 27, 2022

(65) Prior Publication Data
US 2023/0113479 A1   Apr. 13, 2023

(30) Foreign Application Priority Data

Sep. 28, 2021   (JP) ................... 2021-157608

(51) Int. Cl.
| | |
|---|---|
| *B29C 45/03* | (2006.01) |
| *B29C 45/00* | (2006.01) |
| *B29C 45/14* | (2006.01) |
| *B29C 45/16* | (2006.01) |
| *B29C 45/17* | (2006.01) |
| *B29C 45/76* | (2006.01) |
| *B29C 45/84* | (2006.01) |

(52) U.S. Cl.
CPC .......... *B29C 45/03* (2013.01); *B29C 45/0055* (2013.01); *B29C 45/14* (2013.01); *B29C 45/16* (2013.01); *B29C 45/1769* (2013.01); *B29C 45/76* (2013.01); *B29C 45/84* (2013.01); *B29C 2045/1797* (2013.01)

(58) Field of Classification Search
CPC ................... B29C 45/03; B29C 45/14
USPC .................................. 425/151, 425
See application file for complete search history.

(56) References Cited

U.S. PATENT DOCUMENTS

| | | | | |
|---|---|---|---|---|
| 4,364,720 A | * | 12/1982 | Ryder ................. | B29C 45/6707 425/451.2 |
| 4,775,309 A | * | 10/1988 | Hehl .................... | B23Q 1/0009 164/150.1 |
| 6,030,200 A | * | 2/2000 | Ito .......................... | B29C 45/17 425/150 |
| 7,540,736 B2 | * | 6/2009 | Nishimura ............. | B22D 17/20 425/151 |
| 2003/0052489 A1 | * | 3/2003 | Schwesig ................. | F16P 3/12 292/144 |

(Continued)

FOREIGN PATENT DOCUMENTS

| | | | | | |
|---|---|---|---|---|---|
| CN | 105235168 A | * | 1/2016 | | |
| DE | 102012004018 A1 | * | 9/2012 | ............. | B22D 17/20 |
| JP | 2017-087689 A | | 5/2017 | | |

OTHER PUBLICATIONS

Machine translation CN105235168A (Year: 2016).*
Machine translation DE102012004018A1 (Year: 2012).*

*Primary Examiner* — Jacob T Minskey
*Assistant Examiner* — Wayne K. Swier
(74) *Attorney, Agent, or Firm* — Harness, Dickey & Pierce, P.L.C.

(57) ABSTRACT

An injection molding system includes a main unit in which a first injection molding machine that injects a first molding material and molds a molded article is disposed and a control unit separated from the main unit and configured to control the first injection molding machine. The control unit is coupled to the main unit via a connection cable having predetermined length.

8 Claims, 13 Drawing Sheets

(56) References Cited

U.S. PATENT DOCUMENTS

2016/0311143 A1* 10/2016 Yoshioka ............ B29C 45/1761
2017/0136671 A1   5/2017 Uchiyama
2020/0016809 A1*  1/2020 Maki ................... B29C 45/1774
2022/0143888 A1*  5/2022 Kodaira .............. B29C 45/1742

* cited by examiner

INJECTION MOLDING SYSTEM

The present application is based on, and claims priority from JP Application Serial Number 2021-157608, filed Sep. 28, 2021, the disclosure of which is hereby incorporated by reference herein in its entirety.

BACKGROUND

1. Technical Field

The present disclosure relates to an injection molding system.

2. Related Art

Concerning an injection molding system, JP-A-2017-87689 (Patent Literature 1) discloses a system including a plurality of molding cells coupled to a management device via a network. The molding cells include an injection molding machine, a temperature adjuster that adjusts the temperature of molds, an imaging device that images a molded article, and a robot that takes out the molded article. The configuration of the molding cells can be customized. For example, a configuration including a molded article taking-out device instead of the robot, a configuration including a molded article measuring device, or a configuration not including the molded article imaging device is possible.

Patent Literature 1 mentions that the devices configuring the molding cells are coupled by a communication line but does not particularly refer to physical disposition of the devices. In recent years, there has been a demand for a reduction in the size of manufacturing equipment. In the injection molding system including a plurality of devices concerning injection molding as explained above, there has been a demand for a technique capable of realizing space saving while improving flexibility of customization.

SUMMARY

According to an aspect of the present disclosure, an injection molding system is provided. The injection molding system includes: a main unit in which a first injection molding machine that injects a first molding material and molds a molded article is disposed; and a control unit separated from the main unit and configured to control the injection molding machine. The control unit is coupled to the main unit via a connection cable having predetermined length.

DESCRIPTION OF EXEMPLARY EMBODIMENTS

A. First Embodiment

Figure 1:
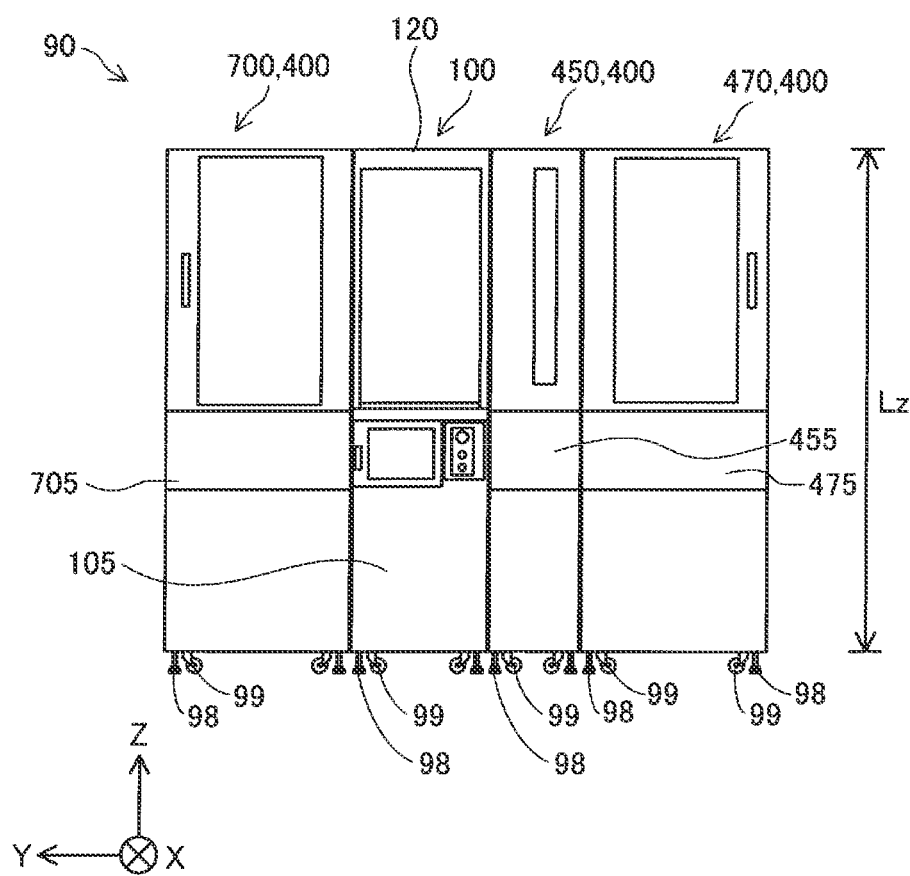
FIG. 1 is a front view showing a schematic configuration of an injection molding system in a first embodiment.
Figure 2:
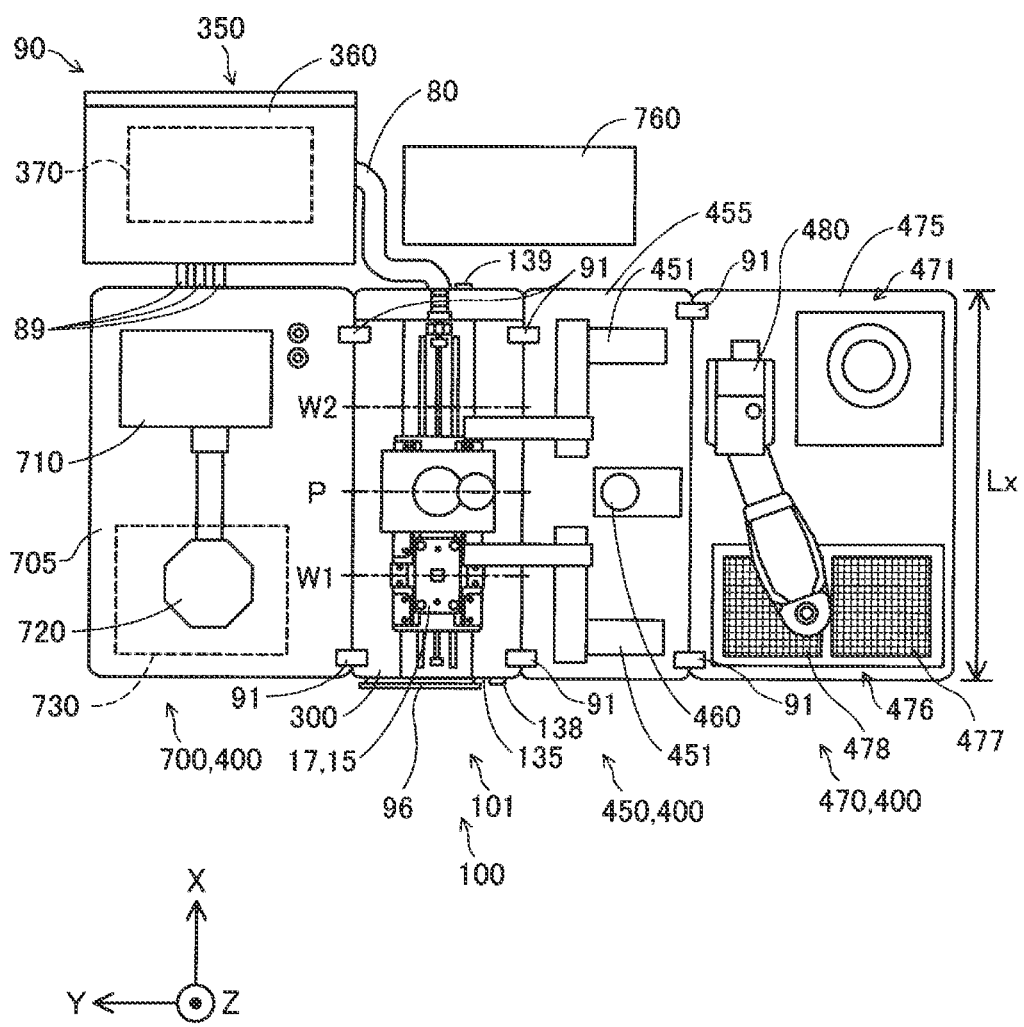
FIG. 2 is a plan view showing the schematic configuration of the injection molding system in the first embodiment.

FIG. 1 is a front view showing a schematic configuration of an injection molding system 90 in a first embodiment. FIG. 2 is a plan view showing the schematic configuration of the injection molding system 90 in the first embodiment. In FIGS. 1 and 2, arrows along X, Y, and Z directions orthogonal to one another are shown. The X, Y, and Z directions are directions along an X axis, a Y axis, and a Z axis, which are three spatial axes orthogonal to one another, and respectively include both of directions on one side along the X axis, the Y axis, and the Z axis and opposite directions of the directions. The X axis and the Y axis are axes along the horizontal plane and the Z axis is an axis along the vertical line. A −Z direction is the vertical direction and a +Z direction is a direction opposite to the vertical direction. The −Z direction is referred to as "downward" as well and the +Z direction is referred to as "upward" as well. In the other figures, the arrows along the X, Y, and Z directions are shown as appropriate. The X, Y, and Z directions in FIGS. 1 and 2 and the X, Y, and Z directions in the other figures represent the same directions.

As shown in FIG. 2, the injection molding system 90 includes a main unit 100 in which a first injection molding machine 101 that molds a molded article through injection molding is disposed and a control unit 350 that controls the first injection molding machine 101. The main unit 100 and the control unit 350 are separated from each other and coupled via a connection cable 80. The injection molding system 90 in this embodiment further includes option units 400 in which peripheral devices are disposed and a mold temperature adjuster 760. In this embodiment, the control unit 350 and the option units 400 are respectively individually coupled by sub-cables 89. In FIG. 1, the connection cable 80, the sub-cables 89, the control unit 350, and the mold temperature adjuster 760 are not shown.

As shown in FIGS. 1 and 2, in this embodiment, the option units 400 include a first option unit 450, a second option unit 470, and a fourth option unit 700. Robots 451 are disposed in the first option unit 450 as peripheral devices. An inspection device 471 is disposed in the second option unit 470 as a peripheral device. A material drier 710 and a material supply device 720 are disposed in the fourth option unit 700 as peripheral devices.

In this embodiment, the first option unit 450 is disposed adjacent to the main unit 100 in the −Y direction of the main unit 100. The second option unit 470 is disposed adjacent to the first option unit 450 in the −Y direction of the first option unit 450. The fourth option unit 700 is disposed adjacent to the main unit 100 in the +Y direction of the main unit 100. In the following explanation, when the units included in the option units 400 are not particularly distinguished from one another, these units are sometimes simply referred to as option units 400.

The main unit 100, the option units 400, and the control unit 350 are configured as one unit by integrating one or a plurality of devices, members, and the like as one set. As shown in FIGS. 1 and 2, in this embodiment, the main unit 100 and the option units 400 respectively include box-like housings and are configured by disposing devices, members, and the like on or inside the housings and integrating the devices, the members, and the like. The control unit 350 includes an electric box 360, which is a rectangular parallelepiped housing, and is configured by disposing a control device 370 and the like explained below in the electric box 360 and integrating the control device 370 and the like. In another embodiment, the units may be configured by, for example, disposing one or a plurality of devices, members, and the like on a table and integrating the devices, the members, and the like.

As shown in FIG. 1, the housings of the main unit 100 and the option units 400 in this embodiment has a rectangular parallelepiped shape. In the following explanation, the housing of the main unit 100 is sometimes referred to as main housing 135. The housings of the first option unit 450, the second option unit 470, and the fourth option unit 700 are respectively sometimes referred to as a first housing 455, a second housing 475, and a fourth housing 705.

The option units 400 are attachable to and detachable from the main unit 100. As shown in FIG. 2, in this embodiment, the main unit 100 and the option unit 400 adjacent to each other and the option units 400 adjacent to each other are coupled by plate-like members 91 for coupling. For example, the first option unit 450 is detachably coupled to the main unit 100 by fastening the plate-like members 91, which are bridged to the main unit 100 and the first option unit 450, to both the units with bolts. Similarly, the second option unit 470 is coupled to the first option unit 450 by the plate-like members 91. The fourth option unit 700 is coupled to the main unit 100 by the plate-like members 91 and detachably coupled to the main unit 100 by connecting a not-shown pipe and a not-shown wire included in the fourth option unit 700 to the main unit 100. Connecting means for detachably connecting the option units 400 to the main unit 100 is not limited to the bolt and the pipe explained above. A fastener such as a clamp and various metal fittings may be used. For example, when the main unit 100 and the second option unit 470 are disposed adjacent to each other, the main unit 100 and the second option unit 470 can also be coupled by the plate-like members 91.

Wheels 99 are respectively provided under the housings of the main unit 100 and the option units 400. Consequently, the main unit 100 and the option units 400 are respectively capable of moving independently in a state in which the main unit 100 and the option units 400 are not coupled to the other units. Bolt-type stoppers 98 are provided near the wheels 99. A user can fix the main unit 100 and the option units 400 or the injection molding system 90 in any setting places by using the stoppers 98.

The main unit 100 and the option units 400 are respectively include box-like coverts opened in the −Z direction. In this embodiment, the covers have rectangular parallelepiped external shapes, are disposed on the housings of the units, and cover the devices, the members, and the like disposed on the housings of the units. In the following explanation, the cover provided in the main unit 100 and covering the first injection molding machine 101 is sometimes particularly referred to as main cover 120. Foreign matters such as dust are prevented from intruding into the injection molding system 90 by the covers. At least a part of ceiling surfaces and side surfaces of the covers in this embodiment are made of transparent glass, resin, or the like such that a work situation on the inside can be visually recognized from the outside. In FIG. 2, the injection molding system 90 in a state in which the covers are removed is viewed from above. In this way, the main cover 120 is attachable to and detachable from the main unit 100. Similarly, the covers are attachable to and detachable from the option units.

In this embodiment, dimensions in the X direction and dimensions in the Z direction of the main unit 100 and the option unis 400 are unified. More specifically, as shown in FIG. 2, dimensions in the X direction of the housings of the main unit 100 and the option units 400 are unified to a dimension Lx. As shown in FIG. 1, dimensions in the Z direction of the housings are unified to a dimension Lz. Consequently, when the main unit 100 and the option units 400 are disposed in the Y direction as in this embodiment, in the X direction and the Z direction, a certain unit is prevented from further projecting than the other units and disposition of the units is less likely to be limited by setting spaces. For example, when the option units 400 are added or replaced, in the X direction and the Z direction, disposition of the option units 400 is less likely to be limited by setting spaces. In this embodiment, dimensions in the X direction and the Z direction of the covers provided in the main unit 100 and the option units 400 and dimensions of the wheels 99 are also respectively unified.

Figure 3:
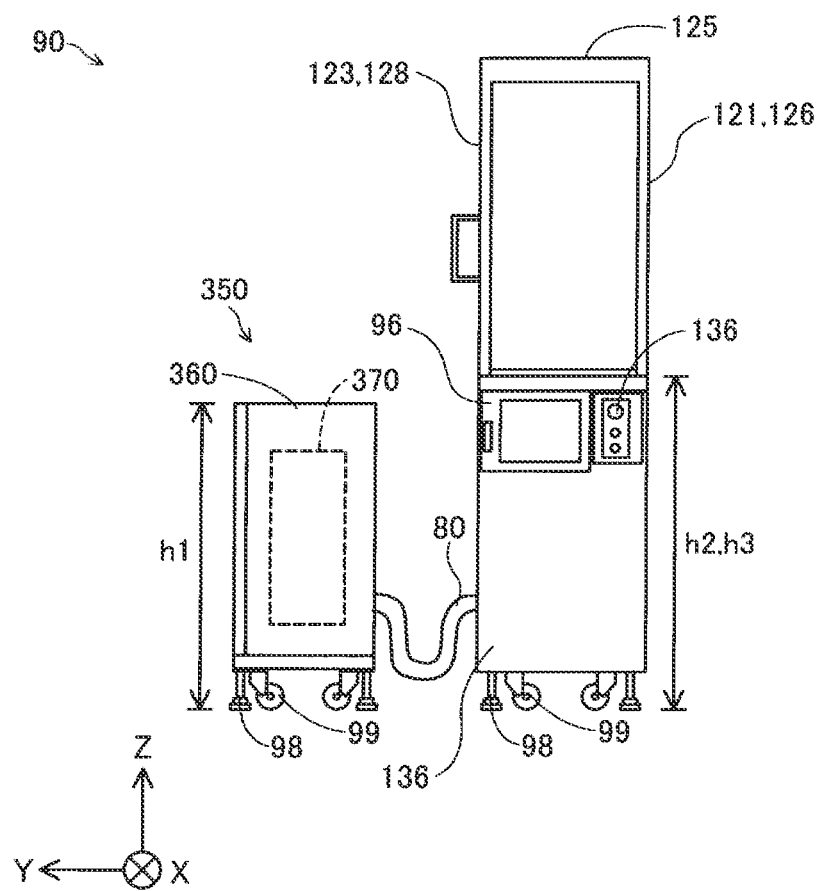
FIG. 3 is a front view showing a schematic configuration of a main unit and a control unit.
Figure 4:
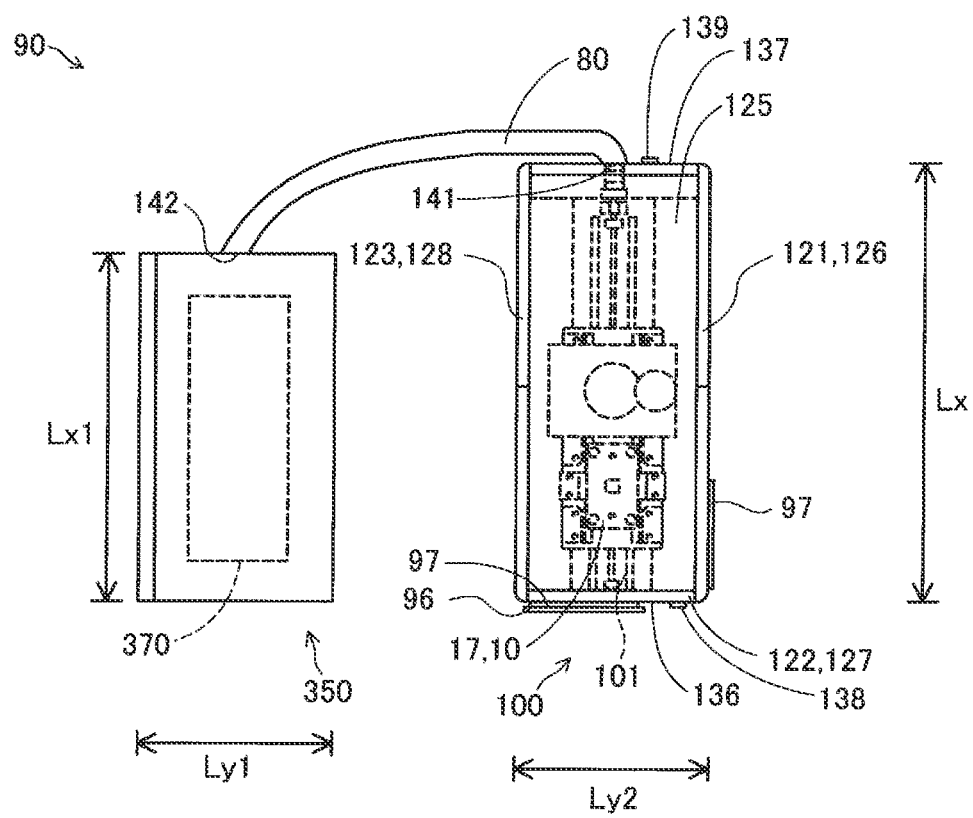
FIG. 4 is a plan view showing the schematic configuration of the main unit and the control unit.

FIG. 3 is a front view showing a schematic configuration of the main unit 100 and the control unit 350. FIG. 4 is a plan view showing the schematic configuration of the main unit 100 and the control unit 350. In FIGS. 3 and 4, the main unit 100 attached with the main cover 120 is shown. In FIG. 4, the first injection molding machine 101 in the main cover 120 is indicated by a broken line.

The control unit 350 in this embodiment includes the electric box 360 explained above and the control device 370 disposed in the electric box 360. In this embodiment, the control unit 350 controls, with the control device 370, the peripheral devices disposed in the option units 400 in addition to the first injection molding machine 101. The control device 370 is configured by a PLC (programmable logic controller). The control device 370 is programmed by a language such as a ladder language to thereby control a cooperative operation of the first injection molding machine 101 and the peripheral devices. In the electric box 360 in this embodiment, for example, a not-shown power supply section for supplying electric power to the first injection molding machine 101 and the peripheral devices and a not-shown motor driver for driving the first injection molding machine 101 and the like are disposed in addition to the control device 370. One side surface of the electric box 360 is configured as a door for opening and closing the electric box 360.

In this embodiment, as in the housings of the main unit 100 and the option units 400, the wheels 99 and the stoppers 98 are provided below the electric box 360. Consequently, the control unit 350 can be more easily set in any setting place.

As shown in FIGS. 3 and 4, a first door 126 configured to be openable and closable is provided in a first cover side surface 121, which is a first side surface of the main cover 120. A second door 127 configured to be openable and closable is provided in a second cover side surface 122, which is a second side surface of the main cover 120. The first cover side surface 121 and the second cover side surface 122 are respectively different side surfaces of the main cover 120. In this embodiment, the first cover side surface 121 is a side surface in the −Y direction of the main cover 120. The second cover side surface 122 is a side surface in the −X direction of the main cover 120. At least one of the first door 126 and the second door 127 is preferably configured to be attachable to and detachable from the main cover 120. In this embodiment, both of the first door 126 and the second door 127 are configured to be attachable to and detachable from the main cover 120. In this embodiment, a third door 128 configured to be openable and closable is further provided in the third cover side surface 123 of the main cover 120. The third cover side surface 123 is disposed in a position opposed to the first cover side surface 121 in the Y direction. Like the first door 126 and the second door 127, the third door 128 in this embodiment is configured to be attachable to and detachable from the main cover 120.

Figure 5:
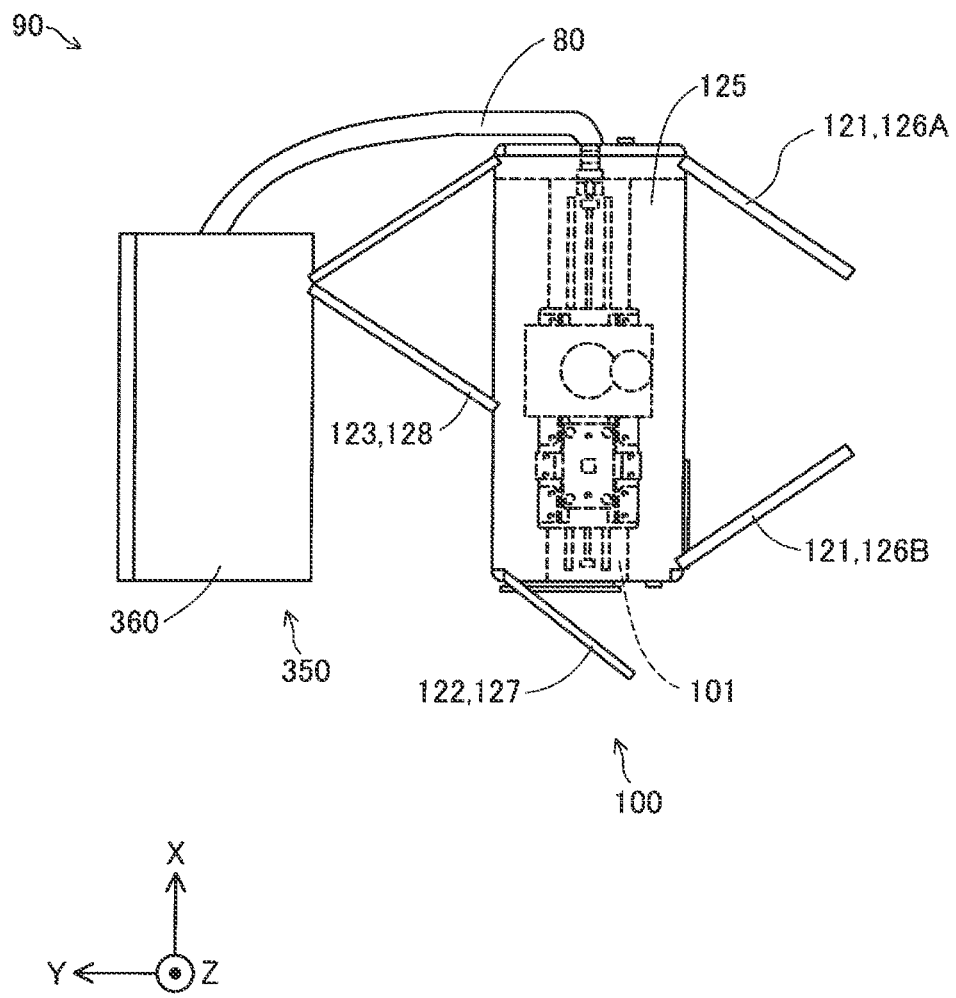
FIG. 5 is a diagram showing a state of opening and closing of doors provided in a main cover.

FIG. 5 is a diagram showing a state of opening and closing of the doors provided in the main cover 120. In this embodiment, the first cover side surface 121 to the third cover side surface 123 themselves respectively function as the first door 126 to the third door 128 explained above. More specifically, the first cover side surface 121 is configured by a right door 126A and a left door 126B and configured to be openable and closable in a double-opening manner. The right door 126A is detachably fixed to, via a hinge, a column provided at a corner in the +X direction and the −Y direction of a ceiling surface 125 of the main cover 120. The left door 126B is fixed to, via a hinge, a column provided at a corner in the −X direction and the −Y direction of the main cover 120. The second cover side surface 122 is configured as a single-opening door and is detachably fixed to, via a hinge, a column provided at a corner in the −X direction and the +Y direction of the main cover 120. The third cover side surface 123 is detachably fixed to, via a hinge, a column provided at a corner in the +X direction and the +Y direction of the main cover 120 and configured to be openable and closable in a folding manner. The columns are respectively fixed to the ceiling surface 125 of the main cover 120. Accordingly, the main cover 120 can be attached to and detached from the main unit 100 by lifting and moving the columns and the side surfaces together with the ceiling surface 125.

In a door of a surface having a large opening width and a large opening area, a stroke in holding a handle and opening the door is large. Accordingly, the doors highly likely to be frequently opened and closed among the doors provided in the covers such as the main cover 120 are preferably configured in a double-opening type in which an opening and closing stroke per door is relatively small. If a door is the double-opening type, left and right doors can be independently opened and closed. Only the other door can be opened and closed while one door is kept closed according to, for example, content of work to be carried out by opening the door. When opening and closing types of doors provided on side surfaces of a cover are respectively different as in the main cover 120 in this embodiment, considering, for example, easiness of work to be carried out by opening the door, the devices, the members, and the like disposed on the housings of the units may be, for example, disposed closer to a surface on which a door of an opening and closing type with which the work is easily carried out or may be disposed away from a surface on which a specific door is provided.

In another embodiment, the doors of the main cover 120 may not be configured by the side surfaces of the main cover 120 and, for example, may be configured as doors for opening and closing opening sections formed in a part of the side surfaces. Area sensors that detect intrusion of foreign matters and the like into the main cover 120 may be provided in portions opened and closed by the doors. An opening section not including a door may be formed in the main cover 120. An area sensor for detecting intrusion of foreign matters and the like into the main cover 120 via the opening section may be provided.

In this embodiment, the lower end of the first door 126 and the lower end of the second door 127 of the main cover 120 are provided in a position higher than the upper end of the control unit 350. More specifically, length h1 in the height direction of the control unit 350 shown in FIG. 3 is smaller than length h2 in the height direction from the lower end of the main unit 100 to the first door 126 and length h3 in the height direction from the lower end of the main unit 100 to the second door 127. In this embodiment, the length h1 is length in the Z direction from the lower end of the wheel 99 of the control unit 350 to the upper surface of the electric box 360. The length h2 and the length h3 are the same length and are the same length as length from the lower end of the wheel 99 of the main unit 100 to the lower end of the main cover 120 in the Z direction. Consequently, the lower end of the first door 126 and the lower end of the second door 127 are located above the upper end of the electric box 360. Accordingly, even when the main unit 100 and the control unit 350 are disposed near, the doors of the main cover 120 attached to the main unit 100 can be opened and closed without being brought into contact with the control unit 350.

The control unit 350 in this embodiment has an external shape smaller than an external shape of the main unit 100. More specifically, a dimension Ly1 in the Y direction of the control unit 350 in FIGS. 3 and 4 is the same as a dimension Ly2 in the Y direction of the main unit 100. A dimension Lx1 in the X direction of the control unit 350 is smaller than a dimension Lx2 in the X direction of the main unit 100. The length h1 of the control unit 350 explained above is smaller than a dimension in the Z direction of the main unit 100. Consequently, disposition positions of the main unit 100 and the option units 400 are less easily limited by the position of the control unit 350. In this embodiment, the dimension Ly1 and the dimension Lx1 are respectively the same as a dimension in the X direction and a dimension in the Y direction of the electric box 360.

In this embodiment, a first emergency stop button 138 is provided on a first side surface 136, which is a first side surface of the main housing 135, and a second emergency stop button 139 is provided on a second side surface 137, which is a second side surface of the main housing 135. The emergency stop buttons are buttons for stopping the operation of the first injection molding machine 101 and are used, for example, when an abnormality occurs during injection molding by the first injection molding machine 101. The first side surface 136 and the second side surface 137 are respectively different side surfaces of the main housing 135. In this embodiment, the first side surface 136 is a side surface in the −X direction of the main housing 135 and the second side surface 137 is a side surface in the +X direction of the main housing 135.

The main unit 100 includes a tablet terminal 96 configured to be attachable to and detachable from the main unit 100. The tablet terminal 96 performs, for example, display of various kinds of information concerning the operation and the like of the first injection molding machine 101 and reception of operation from the user. The main unit 100 in this embodiment includes two holders 97 that attachably and detachably support the tablet terminal 96. The holders 97 are provided on the first side surface 136 and the side surface in the −Y direction of the main housing 135. Wiring sections including cables for supplying electric power to the tablet terminal 96 and LAN cables are respectively provided in the holders 97. Therefore, even when the tablet terminal 96 is attached to any one of the holders 97, the tablet terminal 96 can be used in a state in which the tablet terminal 96 is coupled to the wiring section.

The connection cable 80 in this embodiment couples the main unit 100 and the control unit 350 via a first connecting section 141 provided on the side surface in the +X direction of the main housing 135 and a second connecting section 142 provided on the side surface in the +X direction of the electric box 360. The connection cable 80 is configured by binding a plurality of cables with an insulating sheet such as vinyl chloride and a cable tie. The connection cable 80 includes various cables such as a cable for supplying electric power to the first injection molding machine 101 and a motor cable. In this embodiment, the connection cable 80 is configured by binding ten to fifteen cables and has a diameter of approximately 100 mm to 150 mm.

The connection cable 80 has a predetermined cable length. The cable length is preferably set to, for example, according to dimensions and the like of external shapes of the main unit 100 and the control unit 350, length enough for securing flexibility of a disposition position of the control unit 350 with respect to the main unit 100. For example, when the dimension Ly1 and the dimension Ly2 are 300 to 450 mm, the dimension Lx1 is 630 mm, and the dimension Lx2 is 750 mm, by setting the cable length to 1.2 m or more, an interval of 400 mm or more can be provided between the control unit 350 and the main unit 100, for example, when the control unit 350 is disposed in the +Y direction or the −Y direction of the main unit 100. Consequently, the user can perform maintenance of the first injection molding machine 101 while standing between the control unit 350 and the main unit 100. When the dimensions are the same as those described above, by setting the cable length to 1.6 m or less, it is possible to more easily dispose the control unit 350 near the main unit 100 compared with when the cable length is set longer than 1.6 m.

The sub-cables 89 shown in FIG. 2 include, for example, various cables for power supply to the option units 400 and for controlling the option units 400. Length of the various cables is set to length at which the cables are capable of coupling the control unit 350 and the option units 400 while passing below the main unit 100 and the option units 400. In this embodiment, the sub-cables 89 coupling the control unit 350 and the first option unit 450 are disposed such that a part of the sub-cables 89 pass spaces formed between the lower surfaces of the fourth housing 705 and the main housing 135 and a floor surface. The space is formed by supporting the housings with the wheels 99 and the stoppers 98. The sub-cables 89 coupling the control unit 350 and the second option unit 470 are disposed such that a part of the sub-cables 89 pass spaces formed between the lower surfaces of the fourth housing 705, the main housing 135, and the first housing 455 and the floor surface. Consequently, it is possible to realize further space saving of the injection molding system 90.

Figure 6:
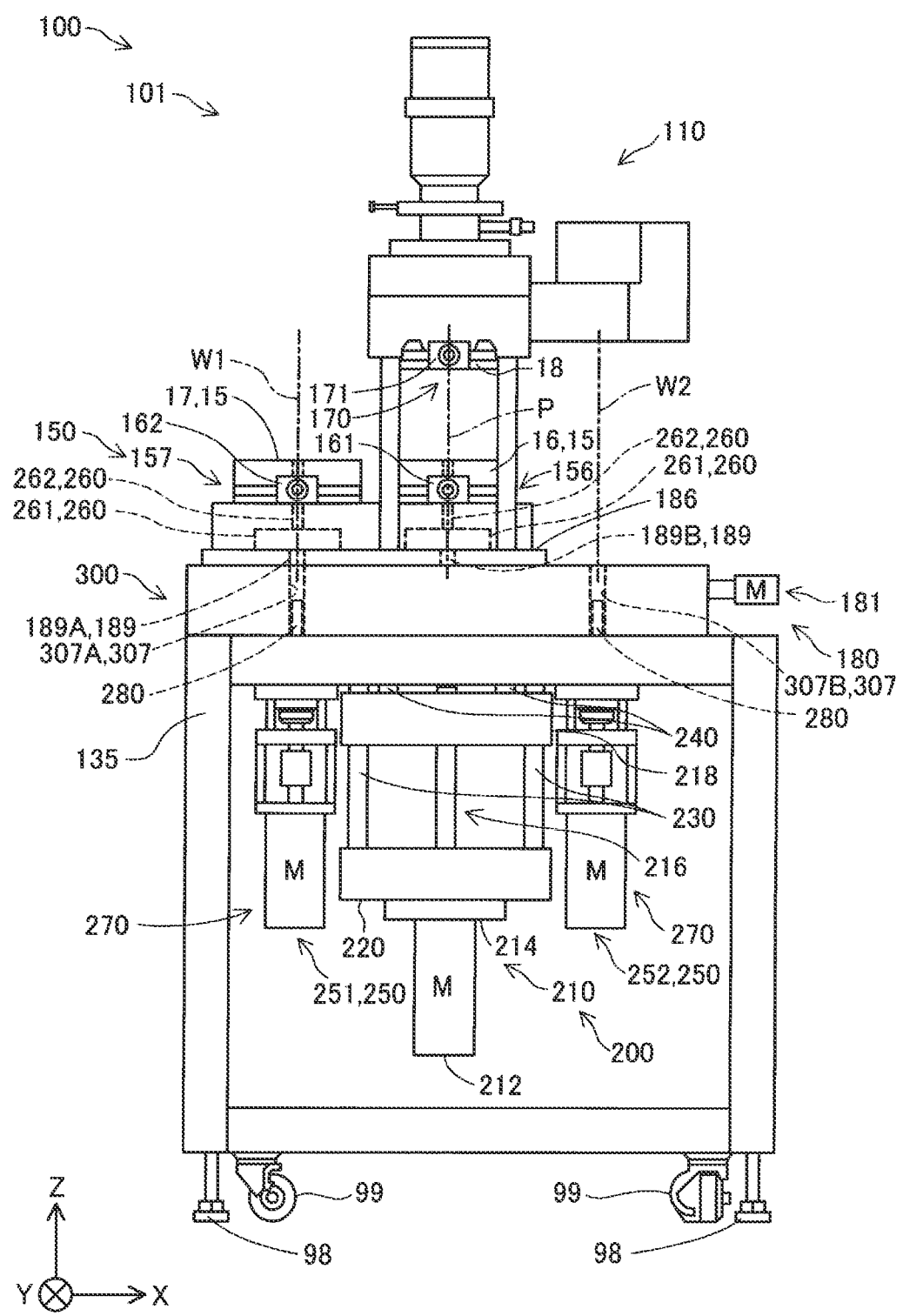
FIG. 6 is a diagram showing a schematic configuration of a first injection molding machine in the first embodiment.

FIG. 6 is a diagram showing a schematic configuration of the first injection molding machine 101 in the first embodiment. In FIG. 6, the main unit 100 from which the main cover 120 is detached is shown. The first injection molding machine 101 in this embodiment includes an injection device 110, a lower-mold supporting section 150, an upper-mold supporting section 170, a position changing section 180, a mold clamping device 200, ejector sections 250, and a main base 300. The main base 300 is fixed to the upper surface of the main housing 135.

A shaping mold can be set in the first injection molding machine 101. The shaping mold includes an upper mold 18 and lower molds 15. As shown in FIG. 6, in this embodiment, a first lower mold 16 and a second lower mold 17 are set as the lower molds 15. The upper mold 18 and the lower molds 15 mark off cavities, which are spaces corresponding to shapes of molded articles. More specifically, unevenness for marking off the cavities is provided on the lower surface of the upper mold 18 and the upper surfaces of the lower molds 15. The upper mold 18 and the lower mold 15 are clamped, whereby a cavity having a shape corresponding to the unevenness is marked off between the upper mold 18 and the lower mold 15. For example, the shaping mold may be made of metal or may be made of resin or ceramic. The shaping mold made of metal is sometimes called metal mold.

The shaping mold is supported by supporting sections of the first injection molding machine 101 to thereby be set in the first injection molding machine 101. In this embodiment, the supporting sections indicate the upper-mold supporting section 170 that supports the upper mold 18 and the lower-mold supporting section 150 that supports the lower molds 15. The upper-mold supporting section 170 is fixed to a lower part of the injection device 110 and configured as a holder including a upper mold clamp 171 for clamping and fixing the upper mold 18 in the Y direction. The lower-mold supporting section 150 is provided below the upper-mold supporting section 170 and configured as a holder including a first lower mold clamp 161 for clamping and fixing the first lower mold 16 in the Y direction and a second lower mold clamp 162 for clamping and fixing the second lower mold 17 in the Y direction. In this embodiment, in a state in which the shaping mold is supported by the supporting sections, the injection device 110, the upper mold 18, and the lower molds 15 are disposed in order downward in the vertical direction.

The first injection molding machine 101 in this embodiment is configured as an injection molding machine that performs insert molding. The insert molding is one of methods of molding a molded article through injection molding and indicates a method of injecting a molding material into a cavity of a shaping mold, in which an insert member is disposed, to thereby mold, as a molded article, an integrated article obtained by integrating the insert member and the injected molding material. In this embodiment, the insert member is placed on the lower mold 15 to thereby be disposed in the cavity of the shaping mold. For example, the insert member may be formed by metal or may be formed by resin. The molding material injected by the first injection molding machine 101 is sometimes referred to as first molding material. The first injection molding machine 101 may include, for example, a sensor or a camera for detecting whether the insert member is appropriately placed on the lower molds 15. A step or the like for positioning the insert member may be provided in the lower molds 15.

The mold clamping device 200 includes a mold driving section 210, a first column section 230, and a second column section 240. The mold driving section 210 includes a mold clamping motor 212, a speed reducer 214, a ball screw section 216, a movable board 218, and a fixed board 220. As shown in FIG. 6, among the members configuring the mold clamping device 200, a part of members such as the mold clamping motor 212 are disposed in the main housing 135.

The first column section 230 is configured by four columns extending in the Z direction. The main base 300 is fixed to the upper end portion of the first column section 230. The fixed board 220 having a flat shape is fixed to the lower end portion of the first column section 230 such that a plate surface of the fixed board 220 is parallel to the horizontal direction. The first column section 230 pierces through the movable board 218 between the main base 300 and the fixed board 220. The mold clamping motor 212 configured by a motor with electromagnetic brake is fixed to a lower part of the fixed board 220 with an output axis of the mold clamping motor 212 directed upward. Driving of the mold clamping motor 212 is controlled by the control device 370 disposed in the control unit 350. In FIG. 6, among the four columns configuring the first column section 230, only two columns disposed in the −Y direction are shown.

The speed reducer 214 in this embodiment is a speed reducer of a concentric axial type in which an input shaft and an output shaft are present on the same axis. The speed reducer 214 is coupled to an output shaft of the mold clamping motor 212 and fixed to a lower part of the fixed board 220. The ball screw section 216 provided to pierce through the fixed board 220 upward is coupled to the output shaft of the speed reducer 214. The movable board 218 having a flat shape is coupled to the ball screw section 216 such that a plate surface of the movable board 218 is parallel to the horizontal direction. In a state in which the lower surface of the movable board 218 is opposed to the upper surface of the fixed board 220, the movable board 218 moves in the Z direction with respect to the fixed board 220 according to rotation of the ball screw section 216 by driving of the mold clamping motor 212 using, as a guide, the first column section 230 piercing through the movable board 218 in the Z direction.

The second column section 240 is configured by four columns extending in the Z direction and is provided to pierce through the main base 300 in the Z direction. In FIG. 6, among the four columns configuring the second column section 240, only two columns disposed in the −X direction are shown. The movable board 218 is fixed to the lower end portion of the second column section 240. The injection device 110 is fixed to the upper end portion of the second column section 240. Accordingly, the injection device 110 and the upper mold 18 fixed to the movable board 218 via the second column section 240 move in the Z direction according to the movement of the movable board 218. Consequently, the mold clamping device 200 in this embodiment can move the injection device 110 and the upper mold 18 in the Z direction in a state in which the shaping mold is supported by the supporting sections and perform clamping and opening of the shaping mold. An injection molding machine that performs mold opening and clamping in the vertical direction like the first injection molding machine 101 is sometimes called vertical-type injection molding machine or vertical-type injection molding device.

As shown in FIG. 6, in this embodiment, the mold clamping motor 212 is disposed below the main base 300. Consequently, compared with a form in which the mold clamping motor 212 is disposed above the main base 300, disposition of the members configuring the injection device 110 and the like is less easily limited by disposition of the mold clamping motor 212. In this embodiment, since the control device 370 is disposed in the control unit 350 separate from the main unit 100, for example, compared with when the control device 370 is disposed in the main housing 135, the mold clamping motor 212 can be easily disposed below the main base 300. Similarly, it is also easy to dispose ejector driving sections 270 explained below of the ejector sections 250 below the main base 300.

Figure 7:
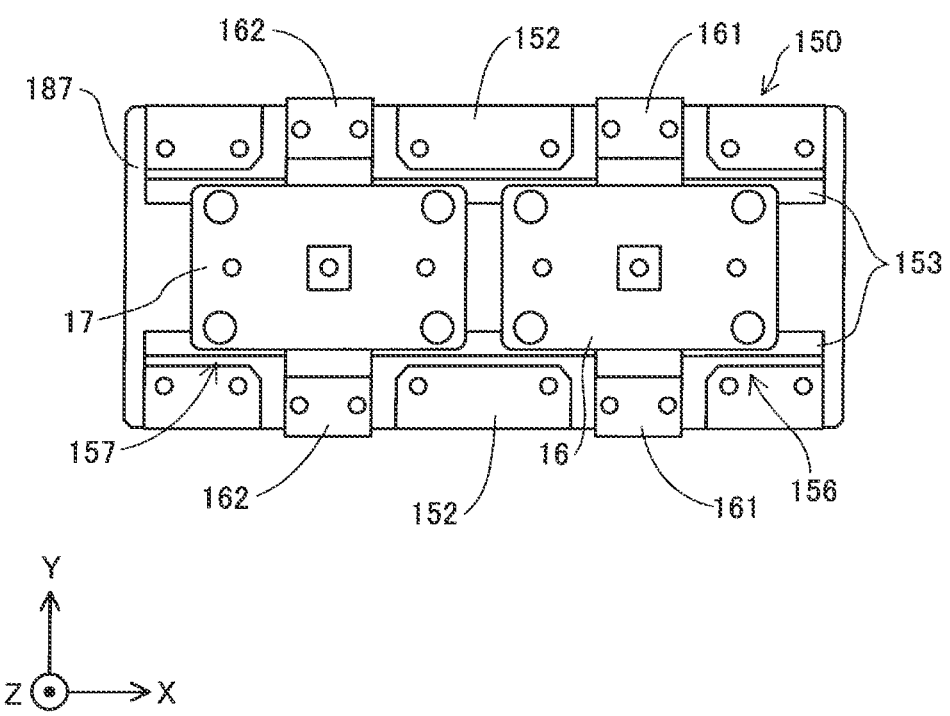
FIG. 7 is a plan view showing a schematic configuration of a lower-mold supporting section.

The position changing section 180 is configured to be capable of linearly moving the lower-mold supporting section 150 in the X direction. The position changing section 180 includes a movable section 186 that supports the lower-mold supporting section 150 and an electric actuator 181 that moves the movable section 186. The electric actuator 181 is configured by a ball screw and a motor that rotates the ball screw. According to driving of the electric actuator 181, the position changing section 180 in this embodiment moves the movable section 186 to slide in the X direction with respect to the main base 300. The driving of the electric actuator 181 is controlled by the control device 370 disposed in the control unit 350. FIG. 7 is a plan view showing a schematic configuration of the lower-mold supporting section 150. In FIG. 7, the lower-mold supporting section 150 and the movable section 186 viewed from above are shown. The lower-mold supporting section 150 includes a pair of blocks 152 disposed to be opposed to each other in the Y direction. Each of the blocks 152 is fixed to the upper surface of the movable section 186 via a bolt. The block 152 includes an edge portion 153 for placing the lower molds 15. More specifically, the edge portion 153 includes a first supporting section 156, which is a portion for supporting the first lower mold 16, and a second supporting section 157, which is a portion for supporting the second lower mold 17. In this embodiment, the first supporting section 156 is located in the +X direction of the second supporting section 157. In the upper surface of the block 152, the first lower mold clamp 161 is provided in a portion corresponding to the first supporting section 156 and the second lower mold clamp 162 is provided in a portion corresponding to the second supporting section 157. The first lower mold clamp 161 and the second lower mold clamp 162 are respectively configured by a pair of clamps provided one by one on the upper surface of each of the blocks 152. In this embodiment, the first lower mold clamp 161 is located in the +X direction of the second lower mold clamp 162.

The position changing section 180 is configured to be capable of switching a state of the first injection molding machine 101 to a first state and a second state by moving the lower-mold supporting section 150. The first state indicates a state in which the first lower mold 16 is located in an injection position P and the second lower mold 17 is located in a first standby position W1 different from the injection position P. The injection position P indicates a position where the lower mold 15 and the upper mold 18 are opposed. The second state indicates a state in which the second lower mold 17 is located in the injection position P and the first lower mold 16 is located in a second standby position W2 different from the injection position P. In this embodiment, the second standby position W2 is located on the opposite side of the first standby position W1 across the injection position P in the X direction. In FIG. 2, as in FIG. 6, the first injection molding machine 101 in the first state is shown. The first injection molding machine 101 may include, for example, a positioning pin or the like for positioning the first lower mold 16 in the injection position P and the second standby position W2 or positioning the second lower mold 17 in the injection position P and the first standby position W1.

The ejector sections 250 are members for removing molded articles from the lower molds 15 and includes main body sections 260 for pushing up the molded articles from the lower molds 15 and ejector driving sections 270 for causing the main body sections 260 to operate. The first injection molding machine 101 in this embodiment includes a first ejector section 251 and a second ejector section 252 as the ejector sections 250. The first ejector section 251 removes the molded article from the second lower mold 17 in the first standby position W1. The second ejector section 252 removes the molded article from the first lower mold 16 in the second standby position W2. The ejector driving section 270 of the first ejector section 251 and the ejector driving section 270 of the second ejector section 252 are disposed across the ejection position P in the X direction. In the following explanation, when the first ejector section 251 and the second ejector section 252 are not particularly distinguished, the first ejector section 251 and the second ejector section 252 are sometimes simply referred to as ejector sections 250.

The main body sections 260 include flat ejector plates 261 and axial ejector pins 262 fixed to the ejector plates 261. The ejector pins 262 are inserted into, from below the lower molds 15, through-holes formed to pierce through, in the Z direction, positions marking off the cavities of the lower molds 15. The ejector plates 261 are disposed below the lower molds 15, more specifically, between the blocks 152 configuring the lower-mold supporting section 150. The main body sections 260 are moved in the X direction together with the lower molds 15 by the position changing section 180. As shown in FIG. 6, hole sections 189 piercing through the movable section 186 in the Z direction are formed in positions of the movable section 186 overlapping at least a part of the ejector plates 261 when viewed in the Z direction. In this embodiment, a first hole section 189A corresponding to the first ejector section 251 and a second hole section 189B corresponding to the second ejector section 252 are formed in the movable section 186 as the hole sections 189.

The ejector driving sections 270 are configured by ball screws and motors that rotate the ball screws. The ejector driving sections 270 are fixed to a lower part of the main base 300. Driving of the ejector driving sections 270 is controlled by the control device 370 disposed in the control unit 350. Contact sections 280 are joined to the ball screws of the ejector driving sections 270.

The contact sections 280 are disposed in hollow sections 307 that pierce through the main base 300 in the Z direction. In this embodiment, in the main base 300, a first hollow section 307A overlapping the first hole section 189A in the first state when viewed in the Z direction and a second hollow section 307B overlapping the second hole section 189B in the second state when viewed in the Z direction are formed as the hollow sections 307. In the first state or the second state, the contact sections 280 move in the +Z direction in the hollow sections 307 and the hole sections 189 according to the driving of the ejector driving sections 270 and come into contact with the ejector plates 261 of the main body sections 260 coupled to the lower molds 15. The contact sections 280 can push up the main body sections 260 in the +Z direction by further moving in the +Z direction in a state in which the contact sections 280 are in contact with the ejector plates 261. The molded articles are pushed up in the +Z direction by the ejector pins 262 of the pushed-up main body sections 260 and are removed from the lower molds 15.

Figure 8:
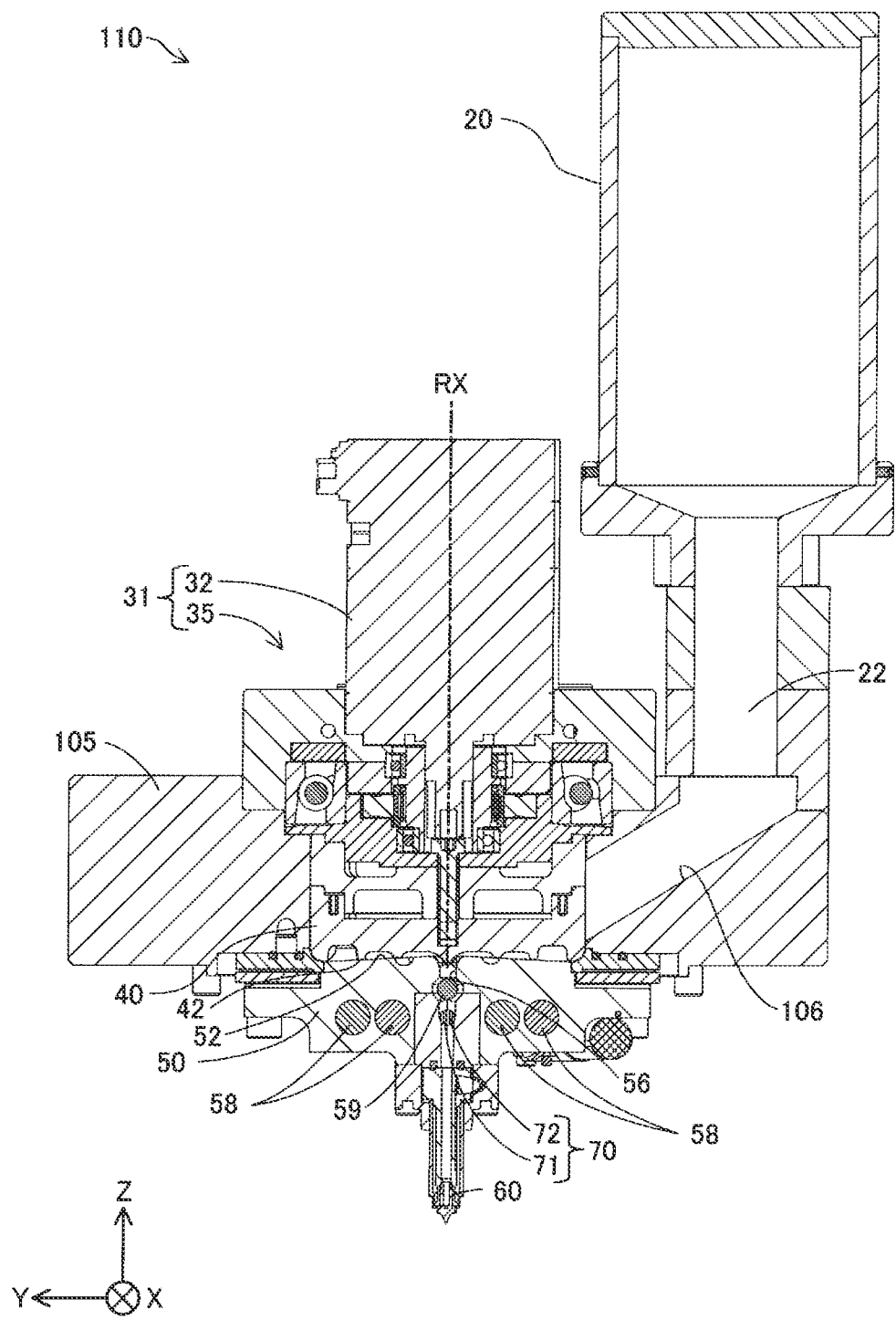
FIG. 8 is a sectional view showing the configuration of an injection device included in the first injection molding machine.

FIG. 8 is a sectional view showing the configuration of the injection device 110 included in the first injection molding machine 101. The injection device 110 includes a material storing section 20, a rotor 40, a barrel 50, heaters 58, a nozzle 60, and an injection control mechanism 70. The injection device 110 plasticizes, with the rotor 40, the barrel 50, and the heaters 58, at least a part of a material supplied from the material storing section 20 to between the rotor 40 and the barrel 50 to generate a molding material and injects the molding material from the nozzle 60 configured as a hot runner nozzle toward the cavity of the shaping mold. "Plasticization" is a concept including melting and means changing a solid into a state having fluidity. Specifically, in the case of a material in which glass transition occurs, plasticization means setting the temperature of the material to a glass transition point or higher. In the case of a material in which glass transition does not occur, plasticization means setting the temperature of the material to a melting point or higher.

The material storing section 20 in this embodiment is configured by a hopper. A material in a state of pellet, powder, or the like is stored in the material storing section 20. In this embodiment, ABS resin formed in a pellet state is used as the material. As shown in FIG. 8, a supply path 22 is provided below the material storing section 20. The supply path 22 is coupled to an introducing path 106 formed in a housing section 105. The material storing section 20 supplies the material to between the rotor 40 and the barrel 50 via the supply path 22 and the introducing path 106.

The rotor 40 is called scroll or flat screw as well. The rotor 40 is driven to rotate centering on a rotation axis RX extending in the Z direction by a rotor driving section 31 configured by a driving motor 32 and a rotor speed reducer 35. The rotor 40 and the rotor speed reducer 35 are housed in the housing section 105. Driving of the rotor driving section 31 is controlled by the control device 370 disposed in the control unit 350.

Figure 9:
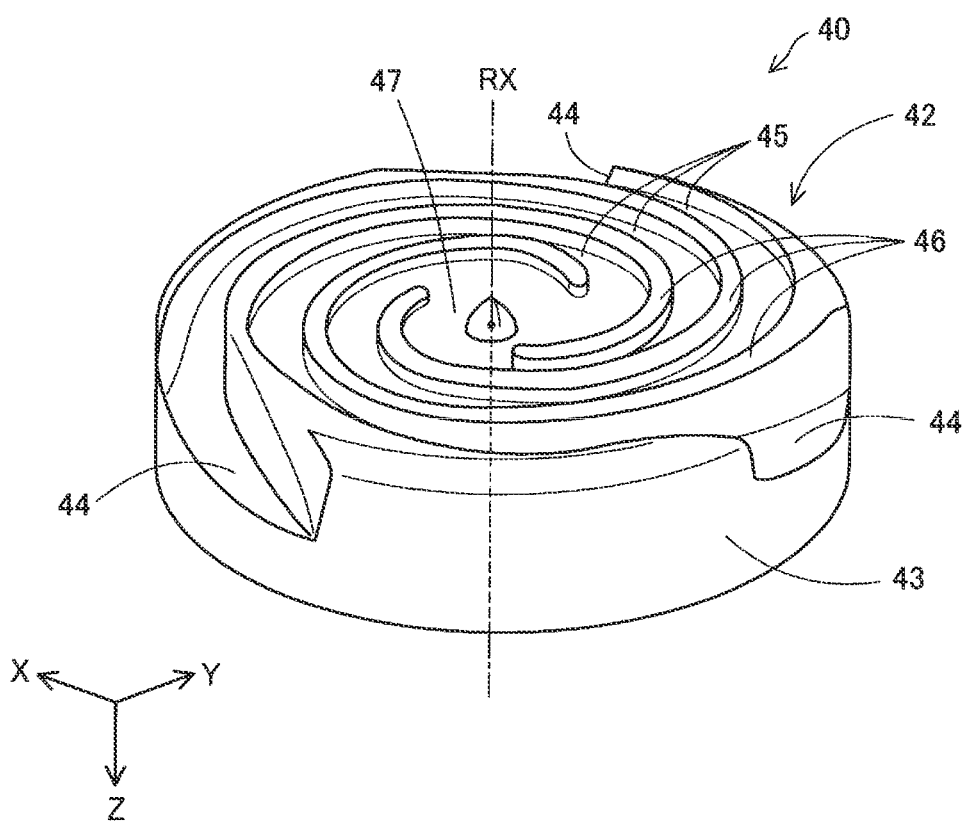
FIG. 9 is a perspective view showing a schematic configuration of a rotor.

FIG. 9 is a perspective view showing a schematic configuration of the rotor 40. The rotor 40 has a substantially columnar shape, the height of which in a direction along the center axis of the rotor 40 is smaller than the diameter thereof. On a groove forming surface 42 of the rotor 40 opposed to the barrel 50, grooves 45 having a swirl shape are formed centering on a center section 47. The grooves 45 communicate with a material charging port 44 formed in a rotor side surface 43 of the rotor 40. The material supplied from the material storing section 20 is supplied to the grooves 45 through the material charging port 44. The grooves 45 are formed by being partitioned by convex ridge sections 46. In FIG. 8, an example is shown in which three grooves 45 are formed. However, the number of grooves 45 may be one or may be two or more. The grooves 45 are not limited to the swirl shape and may be formed in a spiral shape or an involute curve shape or may be formed in a shape extending to draw an arc from the center section 47 toward the outer circumference.

Figure 10:
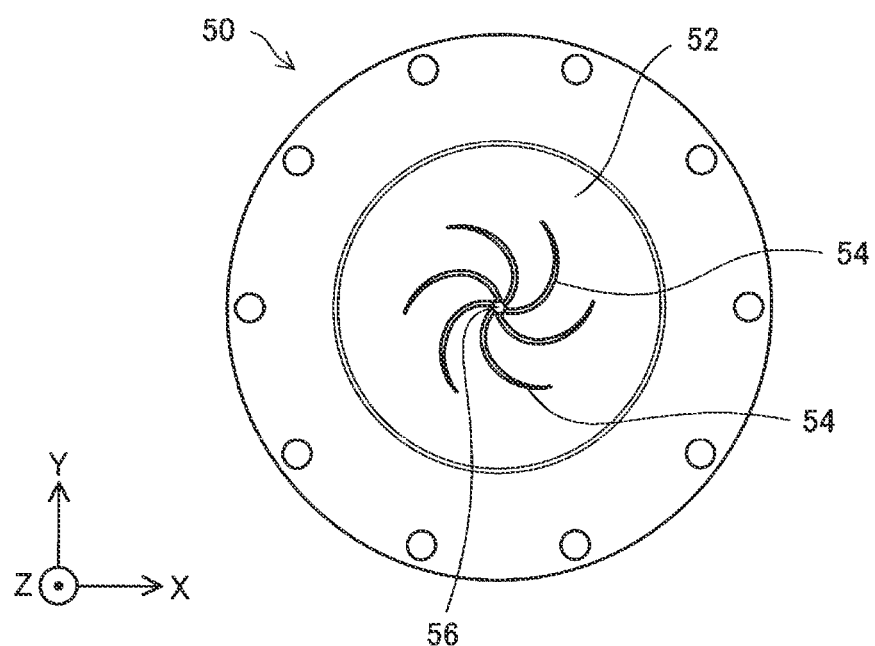
FIG. 10 is a schematic plan view of a barrel.

FIG. 10 is a schematic plan view of the barrel 50. As shown in FIGS. 8 and 10, the barrel 50 has a counter surface 52 opposed to the groove forming surface 42 of the rotor 40. A communication hole 56 that is opened in the center portion of the counter surface 52 and into which a generated molding material flows is formed in the center of the barrel 50. As shown in FIG. 8, an injection cylinder 71 of the injection control mechanism 70 is coupled to the communication hole 56. In the communication hole 56, a check valve 59 is included in an upstream part of the injection cylinder 71. As shown in FIG. 10, a plurality of guide grooves 54 coupled to the communication hole 56 and extending in a swirl shape from the communication hole 56 toward the outer circumference are formed on the counter surface 52. In another embodiment, the guide grooves 54 may not be coupled to the communication hole 56. The guide grooves 54 may not be provided in the barrel 50.

The heaters 58 shown in FIG. 8 heat a material supplied to between the groove forming surface 42 of the rotor 40 and the counter surface 52 of the barrel 50. In this embodiment, four heaters 58 are provided in the barrel 50. An output of the heaters 58 is controlled by the control device 370 disposed in the control unit 350. The material supplied to the grooves 45 of the rotor 40 is guided to the center section 47 of the rotor 40 while being plasticized between the groove forming surface 42 of the rotor 40 and the counter surface 52 of the barrel 50 by the rotation of the rotor 40 and the heating by the heaters 58. The material flowing into the center section 47 is delivered to the communication hole 56 provided in the center of the barrel 50 and further guided from the communication hole 56 to the injection control mechanism 70.

The injection control mechanism 70 includes an injection cylinder 71 and a plunger 72. The injection control mechanism 70 has a function of injecting a molding material in the injection cylinder 71 into the cavity of the shaping mold. The injection control mechanism 70 controls an injection amount of the molding material from the nozzle 60 under control of the control device 370 disposed in the control unit 350. The injection cylinder 71 is a substantially cylindrical member coupled to the communication hole 56 of the barrel 50. In this embodiment, the injection cylinder 71 is disposed in the X direction. The plunger 72 is inserted into the injection cylinder 71. The plunger 72 slides on the inside of the injection cylinder 71 and pressure-feeds the molding material in the injection cylinder 71 to the nozzle 60. The plunger 72 is driven by a not-shown motor.

The mold temperature adjuster 760 shown in FIG. 2 circulates, via a not-shown pipe, a heat medium to a cooling pipe provided in the shaping mold of the first injection molding machine 101 and adjusts the temperature of the shaping mold. In another embodiment, for example, the wheels 99 and the stoppers 98 may be provided in the mold temperature adjuster 760. For example, a unit in which the mold temperature adjuster 760 is disposed may be included in the option units 400.

The first option unit 450 includes the first housing 455, the robots 451, and a posture detecting section 460. In this embodiment, the robots 451 and the posture detecting section 460 are disposed on the first housing 455.

As shown in FIG. 2, in this embodiment, two robots 451 are respectively disposed side by side in the X direction in positions corresponding to the first standby position W1 and the second standby position W2. The robot 451 in this embodiment is configured by an orthogonal robot of a three-axis orthogonal type and includes arms respectively configured by three slide shafts extending along the X axis, the Y axis, and the Z axis. In this embodiment, attraction pads for attracting and gripping a molded article and an insert member are attached to the arms of the robot 451 as end effectors. A controller for controlling the robot 451 is integrally incorporated in the robot 451. The operation of the robot 451 is controlled by, via a controller incorporated in the robot 451, the control device 370 disposed in the control unit 350. In another embodiment, the robot 451 may not be the orthogonal robot and may be, for example, a horizontal articulated robot or may be a vertical articulated robot.

The robot 451 executes a conveying operation for conveying a molded article molded by the first injection molding machine 101. The robot 451 in this embodiment executes, in addition to the conveying operation, a material supplying operation for disposing an insert member in the cavity of the shaping mold of the first injection molding machine 101. In this embodiment, the robot 451 disposed in the position corresponding to the first standby position W1 executes, in the first state explained above, as the conveying operation, conveyance of a molded article removed from the second lower mold 17 and executes, as the material supplying operation, disposition of the insert member in the second lower mold 17. The robot 451 disposed in the position corresponding to the second standby position W2 executes, in the second state, as the conveying operation, conveyance of a molded article removed from the first lower mold 16 and executes, as the material supplying operation, disposition of the insert member in the first lower mold 16. The robots 451 convey the molded articles to a molded article storage place on the first housing 455 in the conveying operation and carry the insert member gripped in an insert member storage place on the first housing 455 to the lower molds 15. In this embodiment, in the first state or the second state, the conveying operation and the material supplying operation for the one of the lower molds 15 and injection molding performed using the other lower mold 15 located in the injection position P can be executed in parallel.

The end effector attached to the arm of the robot 451 may include, for example, a portion for gripping the molded article and a portion for gripping the insert member. With such a form, when the robot 451 executes the conveying operation and the material supplying operation as in this embodiment, the robot 451 can attract the molded article removed from the lower mold 15 while keeping attracting the insert member. Therefore, a moving distance of the arm from when the molded article removed from the lower mold 15 is attracted until when the insert member is placed on the lower mold 15 can be reduced. Accordingly, injection molding can be more efficiently performed. For example, the end effector may be configured not by the attraction pad but by a gripper that grips the molded article and the insert member.

The posture detecting section 460 includes a camera for capturing an image of insert members gripped by the robots 451. The posture detecting section 460 determines, based on the image captured by the camera, whether postures of the insert members gripped by the robots 451 are appropriate. The posture detecting section 460 is controlled by the control device 370 disposed in the control unit 350. When determining that the postures of the insert members are inappropriate, for example, the posture detecting section 460 may temporarily stop the operation of the robots 451 or may cause the robots 451 to grip the insert members again. For example, the posture detecting section 460 may emit a warning to the user via the tablet terminal 96, a not-shown speaker, or the like.

The second option unit 470 includes a second housing 475, an inspection device 471, a stacking mechanism 476, and an inspection robot 480. The inspection device 471 and the inspection robot 480 are disposed on the second housing 475. The stacking mechanism 476 is provided to project upward from the inside of the second housing 475. The inspection device 471 is disposed adjacent to the inspection robot 480 in the −Y direction of the inspection robot 480. The stacking mechanism 476 is disposed adjacent to the inspection device 471 and the inspection robot 480 in the −X direction of the inspection device 471 and the inspection robot 480.

The inspection robot 480 is configured by a horizontal articulated robot. The same end effector as the end effector of the robot 451 is attached to an arm of the inspection robot 480. Like the robot 451 explained above, the inspection robot 480 is controlled by the control device 370 via a controller incorporated in the inspection robot 480. In another embodiment, the inspection robot 480 may not be the horizontal articulated robot and, for example, may be an orthogonal robot or may be a vertical articulated robot.

The inspection robot 480 in this embodiment executes a conveying operation. More specifically, the inspection robot 480 grips a molded article conveyed to the molded article storage place on the first housing 455 by the robot 451 and moves the molded article to the inspection device 471. Further, the inspection robot 480 moves the molded article inspected by the inspection device 471 to a tray on the stacking mechanism 476 explained below and places the molded article on the tray. The robot 451 and the inspection robot 480 may remove a runner and a gate of the molded article with a gate cut device while conveying the molded article to the inspection device 471.

In addition to the conveying operation explained above, the inspection robot 480 in this embodiment executes an operation for conveying an insert member to the insert member storage place on the first housing 455. The inspection robot 480 grips an insert member supplied to a predetermined position on the second housing 475 and conveys the insert member to the insert member storage place on the first housing 455. In this embodiment, the posture detecting section 460 of the first option unit 450 also executes capturing of an image of the insert member gripped by the inspection robot 480 and determination of suitability of a posture of the insert member based on the image.

The inspection device 471 inspects a molded article molded by the first injection molding machine 101. In this embodiment, the inspection device 471 includes a camera for capturing an image of the molded article. The inspection device 471 performs an exterior inspection for the molded article based on the image captured by the camera. If the molded article is determined as a defective article by the inspection device 471, the molded article is discharged to, by the inspection robot 480, a predetermined defective article discharge region provided in the second option unit 470.

The stacking mechanism 476 is a mechanism for stacking a tray for storing an inspected molded article carried from the inspection device 471 by the inspection robot 480. The stacking mechanism 476 includes a first lifting and lowering device 477 and a second lifting and lowering device 478. The inspection robot 480 places a predetermined number of molded articles on the tray disposed on the first lifting and lowering device 477. When the predetermined number of molded articles is placed on the tray, the first lifting and lowering device 477 lowers the tray. A tray disposed at the top of the second lifting and lowering device 478 is slid by a slide mechanism and disposed on the lowered tray. The movement of the tray from the second lifting and lowering device 478 to the first lifting and lowering device 477 may be performed by, for example, the inspection robot 480. A plurality of trays are stacked on the second lifting and lowering device 478. When the top tray moves onto the first lifting and lowering device 477, the second lifting and lowering device 478 lifts the remaining trays. When a predetermined number of trays on which molded articles are placed is stacked on the first lifting and lowering device 477 in this way, manufacturing of molded articles is once stopped. The user takes out, via a door provided in the second housing 475, the trays stacked in the second housing 475 from the second housing 475 and fills new trays in the second lifting and lowering device 478.

The fourth option unit 700 includes the fourth housing 705, the material drier 710, the material supply device 720, and a hot runner controller 730. The material drier 710 dries a material supplied to the first injection molding machine 101. The material supply device 720 supplies the material used in the first injection molding machine 101 to the first injection molding machine 101. The hot runner controller 730 performs temperature adjustment for the nozzle 60 of the first injection molding machine 101. The material drier 710 and the material supply device 720 are disposed on the fourth housing 705. The hot runner controller 730 is disposed in the fourth housing 705.

In this embodiment, the material drier 710 is configured as a drier that, while storing, on the inside, a pellet-like resin material used in the first injection molding machine 101, dehumidifies and dries the resin material. The material supply device 720 is configured as a loader that pressure-feeds the material dehumidified and dried by the material drier 710 to the material storing section 20 of the first injection molding machine 101. The operations of the material drier 710 and the material supply device 720 in this embodiment are controlled by the control device 370 disposed in the control unit 350.

As shown in FIG. 2, in this embodiment, the control unit 350 is disposed adjacent to the fourth option unit 700 in the +Y direction of the fourth option unit 700. More specifically, the control unit 350 is disposed such that one side surface of the electric box 360 and one side surface of the fourth housing 705 are opposed to each other. Consequently, for example, compared with when the control unit 350 and the units other than the fourth option unit 700 are disposed adjacent to each other in the Y direction, the user can more easily approach the units other than the fourth option unit 700 in the Y direction. Therefore, maintainability of the units other than the fourth option unit 700 is improved. The operations of the devices disposed in the fourth option unit 700 in this embodiment are relatively simple. Accordingly, the fourth option unit 700 less frequently requires maintenance compared with the other units. Therefore, by disposing the fourth option unit 700 and the control unit 350 adjacent to each other as explained above, maintainability of the entire injection molding system 90 can be improved. When it is assumed that a side where the tablet terminal 96 of the main unit 100 is attached in FIG. 2 is the front side of the injection molding system 90 and the units, in this embodiment, the control unit 350 is disposed on the rear side of the fourth option unit 700. Therefore, a space on the front side of the injection molding system 90 is more easily secured. Convenience of the entire injection molding system 90 is improved.

In the injection molding system 90 in this embodiment explained above, the main unit 100 in which the first injection molding machine 101 is set and the control unit 350 that controls the first injection molding machine 101 are coupled via the connection cable 80 having the predetermined cable length. Consequently, compared with when a control unit or the like for controlling the first injection molding machine 101 is disposed in the main unit 100, the main unit 100 can be reduced in size. Since the control unit 350 is coupled to the main unit 100 via the connection cable 80, a disposition position of the control unit 350 with respect to the main unit 100 can be optionally changed. Accordingly, it is possible to realize space saving while improving flexibility of customization of the injection molding system 90.

In this embodiment, the first injection molding machine 101 executes insert molding. Accordingly, the injection molding system 90 can mold an integrated article with the insert molding.

In this embodiment, the option units 400, in which the peripheral devices are disposed, can be attached to and detached from the main unit 100. Accordingly, it is possible to realize further space saving than when the units or the devices are separately set while improving flexibility of customization of the injection molding system 90.

In this embodiment, the control unit 350 controls the peripheral devices disposed in the option units 400 in addition to the first injection molding machine 101. Consequently, compared with when control sections or the like for controlling the peripheral devices are disposed in the option units 400, the option units 400 are easily reduced in size. Accordingly, it is possible to realize further improvement of flexibility of customization and further space saving of the injection molding system 90.

In this embodiment, the main unit 100 includes the box-like main cover 120 that covers the first injection molding machine 101. The main cover 120 includes the first door 126 provided on the first cover side surface 121 and the second door 127 provided on the second cover side surface 122. Consequently, the user can access the first injection molding machine 101 in the main cover 120 via either the first door 126 or the second door 127. Therefore, for example, even when other units, devices, and the like are disposed near the first cover side surface 121 and opening and closing of the first door 126 is hindered, the user can access the first injection molding machine 101 in the main cover 120 via the second door 127. Accordingly, the first injection molding machine 101 can be protected by the main cover 120. Flexibility of disposition and customization of the injection molding system 90 can be improved.

In this embodiment, at least one of the first door 126 and the second door 127 is configured to be attachable to and detachable from the main cover 120. Consequently, for example, the first door 126 and the second door 127 can be detached when the main unit 100 and the option units 400 are coupled. In a state in which the main cover 120 is attached to the main unit 100, the main unit 100 and the option units 400 can be more easily coupled. For example, when maintenance of the first injection molding machine 101 is performed, workability of the maintenance can be further improved by detaching the first door 126 and the second door 127 as appropriate according to work content and the like of the maintenance. Since the first door 126 and the second door 127 can be attached to and detached from the main cover 120 as appropriate in this way, the first injection molding machine 101 can be protected by the main cover 120. Flexibility of disposition and customization in the injection molding system 90 can be further improved.

In this embodiment, the lower end of the first door 126 and the lower end of the second door 127 are provided in the position higher than the upper end of the control unit 350. Consequently, even when the control unit 350 is disposed near the main unit 100, opening and closing of the first door 126 and the second door 127 is less easily hindered by the control unit 350. Accordingly, flexibility of a disposition position of the control unit 350 with respect to the main unit 100 is improved.

In this embodiment, the main unit 100 includes the box-like main housing 135. The first emergency stop button 138 is provided on the first side surface 136 of the main housing 135 and the second emergency stop button 139 is provided on the second side surface 137. Consequently, for example, even when other units, devices, and the like are disposed near the first side surface 136 and access to the first emergency stop button 138 is hindered, the user can press the second emergency stop button 139 provided on the second side surface 137. Accordingly, flexibility of disposition and customization in the injection molding system 90 can be further improved.

B. Second Embodiment

Figure 11:
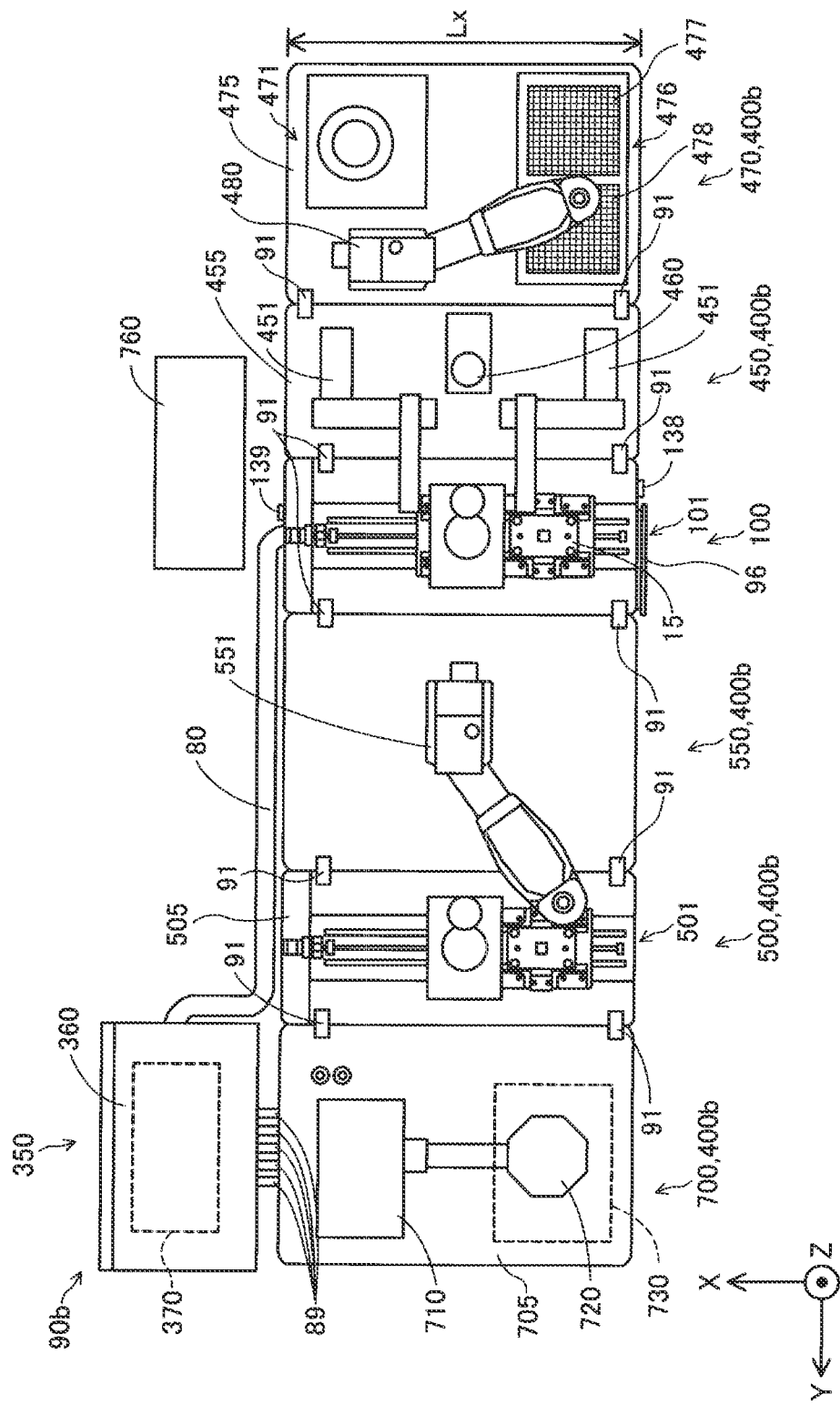
FIG. 11 is a plan view showing a schematic configuration of an injection molding system in a second embodiment.

FIG. 11 is a plan view showing a schematic configuration of an injection molding system 90*b*. In FIG. 11, as in FIG. 2 referred to in the first embodiment, the injection molding system 90*b* in a state in which the covers such as the main cover 120 are removed is viewed from above. Unlike the first embodiment, option units 400*b* in this embodiment include a third option unit 500. Among components of the injection molding system 90*b*, components not particularly explained below are the same as the components in the first embodiment.

The option units 400*b* include the third option unit 500 and a relay unit 550 in addition to the first option unit 450, the second option unit 470, and the fourth option unit 700 explained in the first embodiment. Like the other option units 400, the third option unit 500 and the relay unit 550 respectively include box-like housings and box-like covers and are coupled to the control unit 350 by the sub-cables 89. In the following explanation, the housing provided in the third option unit 500 is sometimes referred to as a third housing 505.

Unlike the first embodiment, in this embodiment, the main unit 100 and the fourth option unit 700 are not disposed adjacent to each other. The relay unit 550 and the third option unit 500 are disposed between the main unit 100 and the fourth option unit 700. The relay unit 550 is disposed adjacent to the main unit 100 in the +Y direction of the main unit 100. The third option unit 500 is disposed adjacent to the relay unit 550 in the +Y direction of the relay unit 550. The relay unit 550 and the fourth option unit 700 are disposed adjacent to each other in the Y direction. The relay unit 550 and the third option unit 500 are respectively coupled to units adjacent thereto by the plate-like members 91. When the main unit 100 and the third option unit 500 are disposed adjacent to each other, the main unit 100 and the third option unit 500 can also be coupled by the plate-like members 91.

In the third option unit 500 in this embodiment, a second injection molding machine 501 is disposed as a peripheral device. In this embodiment, the second injection molding machine 501 injects a second molding material and molds an insert member. The second molding material is generated by, for example, plasticizing a resin material having a color and a composition different from those of a material for generating the first molding material. The second injection molding machine 501 in this embodiment is different from the first injection molding machine 101 in that the second injection molding machine 501 injects the second molding material and in that the second injection molding machine 501 molds the insert member. However, the configurations of sections of the second injection molding machine 501 are the same as the configurations of the first injection molding machine 101. In this embodiment, the second injection molding machine 501 is controlled by the control device 370 disposed in the control unit 350. For example, a drier that dries a material supplied to the second injection molding machine 501 and a device that supplies the material used in the second injection molding machine 501 to the second injection molding machine 501 may be provided in the fourth option unit 700.

A relay robot 551 is disposed on the housing of the relay unit 550. In this embodiment, the relay robot 551 is configured by the same robot as the inspection robot 480. The relay robot 551 is controlled by, via a controller incorporated in the relay robot 551, the control device 370 disposed in the control unit 350. Unlike the robot 451 and the inspection robot 480, the relay robot 551 does not execute a conveying operation and executes only a material supplying operation.

More specifically, the relay robot 551 grips the insert member molded by the second injection molding machine 501 and conveys the insert member to the first injection molding machine 101 and places the insert member on the lower mold 15.

With the injection molding system 90*b* in this embodiment explained above as well, it is possible to realize further space saving than when the units or the devices are separately set while improving flexibility of customization of the injection molding system 90*b*.

C. Third Embodiment

Figure 12:
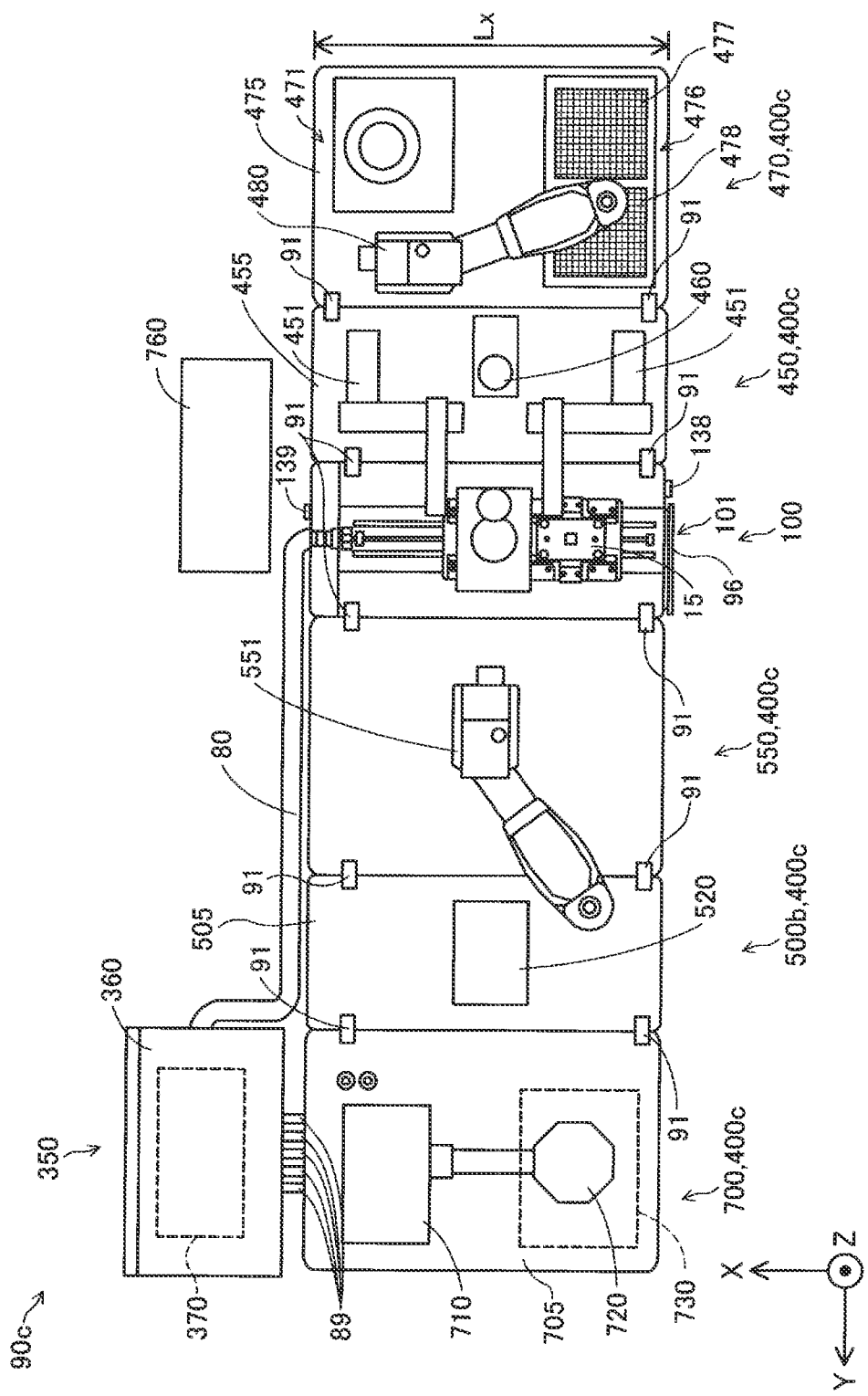
FIG. 12 is a plan view showing a schematic configuration of an injection molding system in a third embodiment.

FIG. 12 is a plan view showing a schematic configuration of an injection molding system 90*c*. In FIG. 12, as in FIG. 11 referred to in the second embodiment, the injection molding system 90*c* in a state in which covers of units are removed is viewed from above. In a third option unit 500*b* included in option units 400*c*, unlike the second embodiment, not the second injection molding machine 501 but a press molding machine 520 is disposed as a peripheral device. Among components of the injection molding system 90*c*, components not particularly explained are the same as the components in the second embodiment.

The press molding machine 520 in this embodiment molds an insert member by press-molding a material made of a metal plate or the like. In this embodiment, the relay robot 551 disposed in the relay unit 550 grips the insert member molded by the press molding machine 520 and conveys the insert member to the first injection molding machine 101 and places the insert member on the lower mold 15.

With the injection molding system 90*c* in this embodiment explained above as well, it is possible to realize further space saving than when the units or the devices are separately set while improving flexibility of customization of the injection molding system 90*c*.

D. Fourth Embodiment

Figure 13:
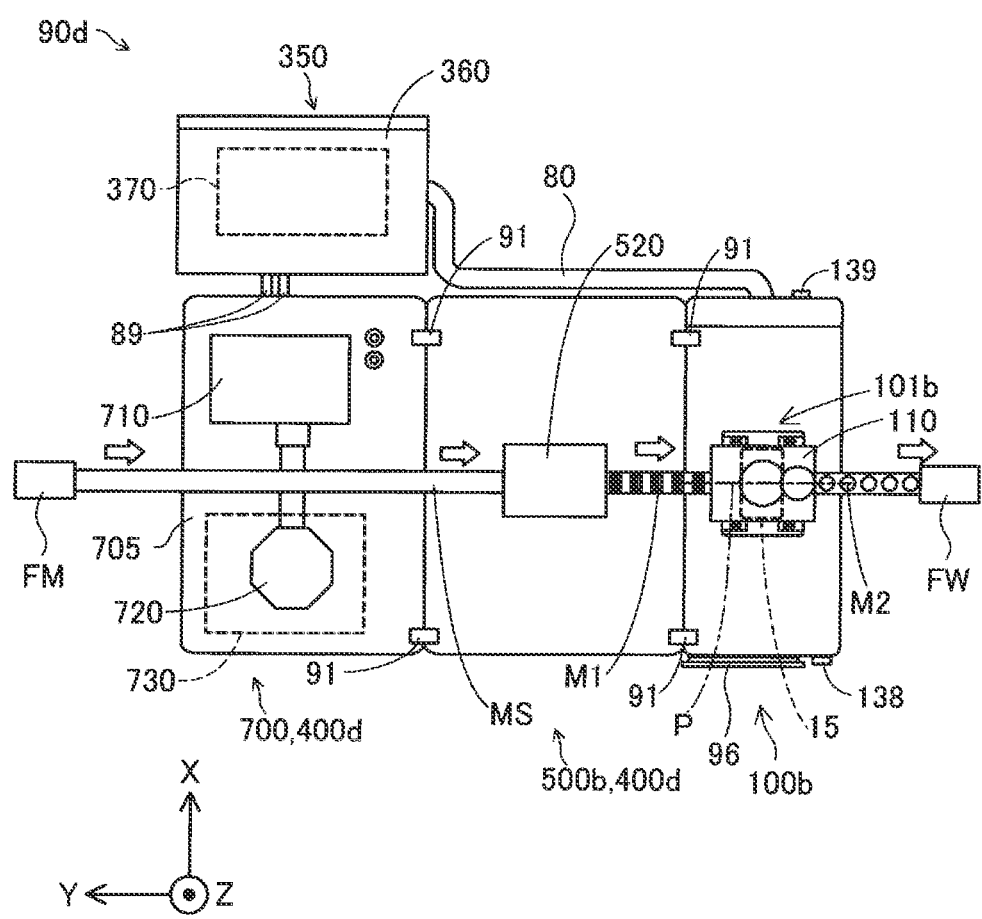
FIG. 13 is a plan view showing a schematic configuration of an injection molding system in a fourth embodiment.

FIG. 13 is a plan view showing a schematic configuration of an injection molding system 90*d*. In FIG. 13, as in FIG. 2 referred to in the first embodiment, the injection molding system 90*d* in a state in which covers of units are removed is viewed from above. Unlike the first embodiment, the injection molding system 90*d* in this embodiment conveys a sheet material MS, continuously forms a plurality of insert members M1 on the sheet material MS through pressing, and performs insert molding using the formed insert members M1 to form a plurality of integrated articles M2 on the sheet material MS. Among components of the injection molding system 90*d*, components not particularly explained are the same as the components in the first embodiment.

As shown in FIG. 13, option units 400*d* in this embodiment include the third option unit 500*b* and the fourth option unit 700. The third option unit 500*b* is disposed adjacent to a main unit 100*b* in the +Y direction of the main unit 100*b*. The third option unit 500*b* and the main unit 100*b* are coupled by the plate-like members 91. In another embodiment, the third option unit 500*b* and the main unit 100*b* may not be disposed adjacent to each other. For example, another unit may be disposed between the third option unit 500*b* and the main unit 100*b*. In this case, the unit disposed between the third option unit 500*b* and the main unit 100*b* is preferably a unit that does not hinder conveyance of the sheet material MS explained below.

In this embodiment, the press molding machine 520 disposed in the third option unit 500*b* punches a part of the sheet material MS having a sheet shape to thereby form a plurality of insert members M1 on the sheet material MS such that the plurality of insert members M1 range along the longitudinal direction of the sheet material MS. For example, when forming the insert members M1, the press molding machine 520 may form, in the sheet material MS, positioning holes for positioning the insert members M1 on the lower molds 15. In this embodiment, the sheet material MS is formed by a metal material.

In this embodiment, a first injection molding machine 101*b* disposed in the main unit 100*b* injects a first molding material in a cavity in which the insert members M1 formed on the sheet material MS are disposed and performs insert molding. Consequently, a plurality of integrated articles M2 are formed on the sheet material MS such that the plurality of integrated articles M2 range along the longitudinal direction of the sheet material MS. The sheet material MS is sometimes referred to as hoop material. A method of performing insert molding using the hoop material on which an insert member is formed is sometimes referred to as hoop molding or chain molding.

Unlike the first embodiment, the first injection molding machine 101*b* in this embodiment does not include the position changing unit 180. The lower mold 15 set in the first injection molding machine 101*b* is always located in the injection position P. The ejector section 250 in this embodiment is configured to be capable of removing the integrated article M2 from the lower mold 15 located in the injection position P. In FIG. 13, the lower mold 15 set in the first injection molding machine 101*b* is located under the injection device 110 and is indicated by a broken line. In FIG. 13, the ejector section 250 is not shown.

The injection molding system 90*d* in this embodiment includes, in addition to the units explained above, an unwinding device FM that unwinds the sheet material MS wound in a roll shape and a winding device FM that winds the sheet material MS in a roll shape. The unwinding device FM and the winding device FW are disposed to sandwich the main unit 100 and the option units 400*d* therebetween in the Y direction. In this embodiment, unwinding and winding of the sheet material MS are realized by rotation driving of the winding device FW. Consequently, the sheet material MS is conveyed in the +Y direction from the unwinding device FM to the winding device FW. The driving of the winding device FW may be controlled by the control device 370 disposed in the control unit 350 or may be controlled by another control section or the like.

In this embodiment, manufacturing of the integrated article M2 is continuously performed while the sheet material MS is conveyed in the +Y direction. First, the sheet material MS unwound from the unwinding device FM is sent to the press molding machine 520 disposed in the third option unit 500*b*. The insert member M1 is formed on the sheet material MS by the press molding machine 520. Subsequently, the sheet material MS on which the insert member M1 is formed is sent to the first injection molding machine 101*b* of the main unit 100. The integrated article M2 is formed on the sheet material MS by the first injection molding machine 101*b*.

In another embodiment, the option units 400*d* may include the second option unit 470 in which the inspection device 471 is disposed. In this case, for example, by disposing the second option unit 470 between the main unit 100 and the winding device FW, it is possible to continuously execute an exterior inspection of the integrated article M2 with the inspection device 471 configured by a camera or the like while conveying the sheet material MS. The conveyance of the sheet material MS may be realized by, for example, driving of the winding device FM or a feeder of an air type or a motor type. In this case, the winding device FW may not be provided in the injection molding system 90*d*. For example, a cutter that cuts the sheet material MS on which the integrated article M2 is formed and cuts out the individual integrated article M2 may be provided in the −Y direction of the main unit 100*b*. In this case, the option units 400*d* may include, for example, the first option unit 450 in which the robot 451 that executes an operation for conveying the integrated article M2 cut by the cutter to the next process or the like is disposed.

With the injection molding system 90*d* in this embodiment explained above as well, it is possible to realize further space saving than when the units or the devices are separately set while improving flexibility of customization of the injection molding system 90*d*.

E. Other Embodiments (E-1) In the embodiments explained above, the first injection molding machine 101 is configured as the injection molding machine that performs the insert molding. In contrast, the first injection molding machine 101 may not be configured as an injection molding machine that performs the insert molding and may be configured as, for example, an injection molding machine that injects a molding material to a shaping mold in which an insert member is not disposed and molds a molded article.

(E-2) In the embodiments, the option unit 400 only has to include at least one of the first option unit 450, the second option unit 470, the third option unit 500, and the fourth option unit 700. The injection molding system 90 may not include the option unit 400.

(E-3) In the embodiments explained above, the robot 451 disposed in the first option unit 450 executes the material supplying operation in addition to the conveying operation. In contrast, the robot 451 may execute only the conveying operation.

(E-4) In the embodiments explained above, the second option unit 470 includes the inspection robot 480. In contrast, the second option unit 470 may not include the inspection robot 480. In this case, conveyance of a molded article to the inspection device 471, conveyance of a molded article for an exterior inspection and subsequent processes, and the like may be performed by the robot 451 disposed in the first option unit 450, may be performed by a robot disposed in another unit, may be performed by another conveying mechanism, or may be performed by manual work. The second option unit 470 may not include the stacking mechanism 476.

(E-5) In the embodiments explained above, the material drier 710 and the material supply device 720 are provided in the fourth option unit 700. In contrast, one of the material drier 710 and the material supply device 720 may not be disposed in the fourth option unit 700. For example, one of the material drier 710 and the material supply device 720 may be disposed on the outside of the injection molding system 90. The hot runner controller 730 may not be disposed in the fourth option unit 700.

(E-6) In the embodiments explained above, the control device 370 of the control unit 350 controls the peripheral devices disposed in the option units 400 in addition to the first injection molding machine 101. In contrast, the control device 370 may not control a part or all of the peripheral devices. In this case, for example, the control device 370 and the option unit 400 including only a peripheral device not controlled by the control device 370 may not be coupled by the sub-cables 89.

(E-7) In the embodiments explained above, the main cover 120 includes the first door 126, the second door 127, and the third door 128. In addition to these doors, for example, the main cover 120 may include a door on a side surface different from the first cover side surface 121 to the third cover side surface 123 or may include a door on the ceiling surface 125. The main cover 120 may include, for example, only two doors, that is, the first door 126 and the second door 127, may include only the first door 126, or may not include a door.

(E-8) In the embodiments explained above, the main cover 120 and the covers provided in the option units 400 have the rectangular parallelepiped shape. In contrast, the covers may include a box shape such as a triangular prism shape or a pentagonal prism shape. For example, ceiling surfaces, side surfaces, and the like of the covers may be formed in curved surface shapes. For example, the units may include not the box-like covers but dome-like covers.

(E-9) In the embodiments explained above, the first door 126 and the second door 127 are configured to be attachable to and detachable from the main cover 120. In contrast, for example, only one of the first door 126 and the second door 127 may be configured to be attachable to and detachable from the main cover 120. Both of the first door 126 and the second door 127 may not be configured to be attachable to and detachable from the main cover 120. Similarly, the third door 128 may not be configured to be attachable to and detachable from the main cover 120. For example, the covers may not be detachable from the units. The units may not include the covers.

(E-10) In the embodiments explained above, the lower end of the first door 126 and the lower end of the second door 127 are provided in the position higher than the upper end of the control unit 350. In contrast, the lower ends of the first door 126 and the second door 127 may be provided in a position lower than the upper end of the control unit 350.

(E-11) In the embodiments explained above, the first emergency stop button 138 and the second emergency stop button 139 are provided in the main housing 135. In addition to these buttons, for example, one or a plurality of emergency stop buttons may be further provided on the first side surface 136, the second side surface 137, or a side surface different from the first side surface 136 and the second side surface 137 of the main housing 135. Only the first emergency stop button 138 may be provided or an emergency stop button may not be provided in the main housing 135. For example, one or a plurality of emergency stop buttons may be provided in the main cover 120.

(E-12) In the embodiments explained above, the first injection molding machine 101 plasticizes the material with the flat screw and generates the first molding material. In contrast, the first injection molding machine 101 may plasticize the material and generate the molding material by, for example, rotating an inline screw.

(E-13) In the embodiments, the mold clamping device 200 performs the mold clamping and the mold opening by moving the injection device 110 and the upper mold 18 in the vertical direction. In contrast, the mold clamping device 200 may perform the mold clamping and the mold opening by moving the lower molds 15 in the vertical direction. The first injection molding machine 101 may be configured as a so-called horizontal-type injection molding machine that performs the mold clamping and the mold opening in the horizontal direction. In this case, for example, the injection device 110 and the upper mold 18 and the lower molds 15 are disposed in this order in the horizontal direction.

(E-14) In the embodiments explained above, the lower-mold supporting section 150 supports the first lower mold 16 and the second lower mold 17. In contrast, the lower-mold supporting section 150 may support, for example, only one lower mold 15.

(E-15) In the embodiments explained above, the position changing section 180 linearly moves the lower mold 15 in the X direction. In contrast, the position changing section 180 may not linearly move the lower molds 15. For example, the position changing section 180 may be configured by a so-called rotary table that moves the lower mold 15 such that a track of the movement of the lower mold 15 draws a circle when viewed along the vertical direction.

(E-16) In the embodiments, the second injection molding machine 501 disposed in the third option unit 500 molds the insert member. In contrast, the second injection molding machine 501 may not mold the insert member and, for example, may mold a molded article in parallel to the first injection molding machine 101. In this case, a molded article molded by the first injection molding machine 101 and a molded article molded by the second injection molding machine 501 may be the same molded article or may be different molded articles.

(E-17) In the embodiments explained above, the second injection molding machine 501 is configured by the same injection molding machine as the first injection molding machine 101. In contrast, the configuration of the second injection molding machine 501 may be different from the configuration of the first injection molding machine 101. For example, one of the first injection molding machine 101 and the second injection molding machine 501 may be configured as a horizontal-type injection molding machine and the other may be configured as a vertical-type injection molding machine. For example, one of the first injection molding machine 101 and the second injection molding machine 501 may be configured as an injection molding machine including a flat screw and the other may be configured as an injection molding machine including not the flat screw but an inline screw.

(E-18) In the embodiments explained above, the dimensions in the X direction and the dimensions in the Z direction of the units are unified. For example, in addition to this, the dimensions in the Y direction may be unified among the units or among a part of the units. Consequently, when the disposition of the units, the dimensions of which in the Y direction are unified, is changed, the change is much less likely limited by a setting space. The dimensions may be unified only among a part of the units. Even in this case, when the disposition of the units, the dimensions of which are unified, is changed, the change is less likely limited by a setting space. The dimensions of the units may not be unified.

(E-19) For example, the option unit 400 may include other units different from the units explained in the embodiments or may include a plurality of the same units. The units may not be disposed in a row or may be disposed in an L shape, a cross shape, or a rectangular shape when viewed in the Z direction. The devices and the like disposed in the units explained in the embodiments may be disposed in other units. For example, the robots 451 functioning as a material supplying robot and a conveying robot may be disposed in the main unit 100, the third option unit 500, or the fourth option unit 700.

F. Other Aspects

The present disclosure is not limited to the embodiments explained above and can be realized in various aspects without departing from the gist of the present disclosure. For example, the present disclosure can be realized by the following aspects. Technical features in the embodiments corresponding to technical features in the aspects described below can be substituted or combined as appropriate in order to solve a part or all of the problems of the present disclosure or in order to achieve a part or all of the effects of the present disclosure. Unless the technical features are explained as essential technical features in this specification, the technical features can be deleted as appropriate.

(1) According to a first aspect of the present disclosure, an injection molding system is provided. The injection molding system includes: a main unit in which a first injection molding machine that injects a first molding material and molds a molded article is disposed; and a control unit separated from the main unit and configured to control the first injection molding machine. The control unit is coupled to the main unit via a connection cable having predetermined length.

According to such an aspect, it is possible to reduce the main unit in size compared with when a control section or the like for controlling the first injection molding machine is disposed in the main unit. Since the control unit is coupled to the main unit via the connection cable, it is possible to optionally change a disposition position of the control unit with respect to the main unit. Accordingly, it is possible to realize space saving while improving flexibility of customization of the injection molding system.

(2) In the aspect, the first injection molding machine may inject the first molding material to a cavity in which an insert member is disposed and mold the molded article obtained by integrating the insert member and the first molding material. According to such an aspect, the injection molding system can mold the molded article obtained by integrating the insert member and the first molding material.

(3) In the aspect, the injection molding system may include an option unit in which a peripheral device is disposed, the option unit may include at least any one of a first option unit in which a robot that conveys the molded article is disposed as the peripheral device, a second option unit in which an inspection device that inspects the molded article is disposed as the peripheral device, a third option unit in which a second injection molding machine or a press molding machine is disposed as the peripheral device, and a fourth option unit in which a material drier that dries a material supplied to the first injection molding machine or a material supply device that supplies the material to the first injection molding machine is disposed as the peripheral device, and the option unit may be attachable to and detachable from the main unit. According to such an aspect, it is possible to realize further space saving than when the units or the devices are separately set while improving flexibility of customization of the injection molding system.

(4) In the aspect, the control unit may control the first injection molding machine and the peripheral device. According to such an aspect, it is easy to reduce the option unit in size compared with when a control section or the like for controlling the peripheral device is disposed in the option unit. Accordingly, it is possible to realize further improvement of flexibility of customization of the injection molding system and further space saving.

(5) In this aspect, the main unit may include a box-like cover that covers the first injection molding machine, and the cover may include a first door provided on a first cover side surface and configured to be openable and closable and a second door provided on a second cover side surface and configured to be openable and closable. According to such an aspect, a user can access the first injection molding machine in the cover via either the first door or the second door. Accordingly, it is possible to protect the first injection molding machine with the cover and improve flexibility of disposition and customization in the injection molding system.

(6) In the aspect, at least one of the first door and the second door may be configured to be attachable to and detachable from the cover. According to such an aspect, the first door and the second door can be attached to and detached from the cover of the main unit as appropriate. Therefore, it is possible to protect the first injection molding machine with the cover and further improve flexibility of disposition and customization in the injection molding system.

(7) In this aspect, a lower end of the first door and a lower end of the second door may be provided in a position higher than an upper end of the control unit. According to such an aspect, even when the control unit is disposed near the main unit, opening and closing of the first door and the second door is less easily hindered by the control unit. Accordingly, flexibility of a disposition position of the control unit with respect to the main unit is improved.

(8) In the aspect, the main unit may include a box-like housing, a first emergency stop button may be provided on a first side surface of the housing, and a second emergency stop button may be provided on a second side surface of the housing. According to such an aspect, even when other units, devices, or the like are disposed near the first side surface and access to the first emergency stop button is hindered, the user can press the second emergency stop button provided on the second side surface. Accordingly, it is possible to further improve flexibility of disposition and customization in the injection molding system.

What is claimed is:

1. An injection molding system comprising:
   a main unit in which a first injection molding machine that injects a first molding material and molds a molded article is disposed; and
   a control unit separated from the main unit, the control unit including a programmable logic controller, the programmable logic controller being configured to control the first injection molding machine, wherein
   the control unit is coupled to the main unit via a connection cable having a predetermined length,
   each of the main unit and the control unit each has wheels, and the main unit and the control unit are configured to be moved independently via the wheels,
   the main unit includes a box-like cover that covers the first injection molding machine,
   the box-like cover includes:
      a first door provided on a first side surface of the box-like cover, and the first door is configured to be openable and closable; and
      a second door provided on a second side surface of the box-like cover, and the second door is configured to be openable and closable,
   the first side surface and the second side surface of the box-like cover are different surfaces from a ceiling surface of the box-like cover, and
   a lower end of the first door and a lower end of the second door are provided at positions higher than an upper end of the control unit.

2. The injection molding system according to claim 1, wherein the first injection molding machine injects the first molding material to a cavity in which an insert member is disposed and molds the molded article obtained by integrating the insert member and the first molding material.

3. The injection molding system according to claim 1, further comprising an option unit in which a peripheral device is disposed, wherein
   the option unit includes at least any one of a first option unit in which a robot that conveys the molded article is disposed as the peripheral device, a second option unit in which an inspection device that inspects the molded article is disposed as the peripheral device, a third option unit in which a second injection molding machine that injects a second molding material or a press molding machine that executes press molding is disposed as the peripheral device, and a fourth option unit in which a material drier that dries a material supplied to the first injection molding machine or a material supply device that supplies the material to the first injection molding machine is disposed as the peripheral device, and
   the option unit is attachable to and detachable from the main unit.

4. The injection molding system according to claim 3, wherein the programmable logic controller is configured to control the peripheral device.

5. The injection molding system according to claim 1, wherein at least one of the first door and the second door is configured to be attachable to and detachable from the box-like cover.

6. The injection molding system according to claim 1, wherein
   the main unit includes a box-like housing,
   the first injection molding machine is disposed on the box-like housing, and
   a first emergency stop button is provided on a first side surface of the box-like housing, and a second emergency stop button is provided on a second side surface of the box-like housing.

7. The injection molding system according to claim 1, wherein
   the main unit includes a box-like housing, a tablet terminal accepting an operation of the first injection molding machine, and first and second holders that attachably and detachably support the tablet terminal,
   the first injection molding machine is disposed in the box-like housing, and each of the first and second holders includes a power cable for supplying electric power to the tablet terminal and a LAN cable, and
   the first holder is provided on a first side surface of the box-like housing, and a second holder is provided on a second side surface of the box-like housing.

8. The injection molding system according to claim 1, wherein
   the first injection molding machine includes:
      a support that supports a molding die including an upper die and a lower die, the lower die having a first lower die and a second lower die, the support including a first support that supports the first lower die and a second support that supports the second lower die;
      an injection head having a screw and a heater, and the injection head is configured to inject the first molding material toward a cavity defined by the upper die and the lower die;
      a die clamping motor configured to relatively move the upper die and the lower die along a vertical direction to clamp and release the upper die and lower die each other; and
      a position changer configured to move the first support and the second support, the position changer is configured to:
   move the first lower die or the second lower die to an injection position where the lower die and the upper die face each other by moving the first support and the second support; and
   switch between a first state to a second state,
the first state is a state in which the first lower die is located in the injection position and the second lower die is located in another position different from the injection position, and
the second state is a state in which the second lower die is located in the injection position and the first lower die is located in the another position.

\* \* \* \* \*